(12) United States Patent
Furukawa

(10) Patent No.: US 9,086,740 B2
(45) Date of Patent: Jul. 21, 2015

(54) OPERATION INPUT DEVICE AND METHOD OF CONTROLLING SAME

(75) Inventor: Kenichi Furukawa, Tokyo (JP)

(73) Assignee: MITSUMI ELECRIC CO., LTD., Tokyo (JP)

( * ) Notice: Subject to any disclaimer, the term of this patent is extended or adjusted under 35 U.S.C. 154(b) by 768 days.

(21) Appl. No.: 12/905,297

(22) Filed: Oct. 15, 2010

(65) Prior Publication Data

US 2011/0096008 A1    Apr. 28, 2011

(30) Foreign Application Priority Data

Oct. 23, 2009   (JP) ................................. 2009-244805

(51) Int. Cl.
G06F 3/02       (2006.01)
G06F 3/0338    (2013.01)
G06F 3/046     (2006.01)

(52) U.S. Cl.
CPC .............. *G06F 3/0338* (2013.01); *G06F 3/046* (2013.01)

(58) Field of Classification Search
CPC ....... G06F 3/02; G06F 3/0202; G06F 3/0338; G06F 3/0354
USPC .................................................. 345/168–179
See application file for complete search history.

(56) References Cited

U.S. PATENT DOCUMENTS

| 4,627,060 A * | 12/1986 | Huang et al. ..................... 714/36 |
| 4,937,504 A * | 6/1990 | Black et al. ..................... 315/307 |
| 5,155,768 A * | 10/1992 | Matsuhara ...................... 463/29 |
| 5,977,888 A * | 11/1999 | Fujita et al. ..................... 341/34 |
| 6,369,806 B1 * | 4/2002 | Endo et al. ..................... 345/174 |
| 6,606,085 B1 | 8/2003 | Endo et al. |
| 6,670,946 B2 | 12/2003 | Endo et al. |
| 6,738,043 B2 | 5/2004 | Endo |
| 6,937,124 B1 * | 8/2005 | Nakamura et al. ............ 335/222 |
| 7,737,943 B2 | 6/2010 | Akieda et al. |
| 7,982,713 B2 * | 7/2011 | Choi et al. ..................... 345/158 |
| 8,653,864 B2 * | 2/2014 | Yamada ........................ 327/143 |
| 8,847,581 B2 * | 9/2014 | Furukawa et al. ........ 324/207.11 |
| 8,854,166 B2 * | 10/2014 | Furukawa et al. .............. 336/30 |
| 2002/0014637 A1 * | 2/2002 | Higuchi ........................ 257/200 |
| 2009/0160789 A1 * | 6/2009 | Kreit et al. ..................... 345/173 |
| 2010/0045360 A1 * | 2/2010 | Howard et al. ............... 327/365 |

(Continued)

FOREIGN PATENT DOCUMENTS

JP    10-247129    9/1998
JP    2001-159963    6/2001

(Continued)

*Primary Examiner* — Alexander Eisen
*Assistant Examiner* — Nelson Lam
(74) *Attorney, Agent, or Firm* — IPUSA, PLLC

(57) ABSTRACT

An operation input device includes a base part including a placement surface on which an inductor is placed; a displacement member including a first surface facing the placement surface and a second surface configured to receive application of a force, and configured to cause the inductance of the inductor to vary with the approach of the first surface to the placement surface due to the application of the force on the second surface; a support member configured to support the displacement member in such a manner as to allow the displacement of the displacement member; a detection part configured to detect a variation in the inductance by feeding a first pulse signal to the inductor; and a control part configured to generate a magnetic field to displace the second surface by feeding a second pulse signal different in phase from the first pulse signal to the inductor.

9 Claims, 19 Drawing Sheets

(56) References Cited

U.S. PATENT DOCUMENTS

| | | | |
|---|---|---|---|
| 2010/0079399 A1* | 4/2010 | Ma | 345/174 |
| 2011/0084933 A1* | 4/2011 | Curtis et al. | 345/174 |
| 2012/0072150 A1* | 3/2012 | Furukawa et al. | 702/65 |
| 2012/0256821 A1* | 10/2012 | Olsson et al. | 345/156 |
| 2012/0306798 A1* | 12/2012 | Zoller et al. | 345/173 |
| 2013/0154942 A1* | 6/2013 | Okada | 345/168 |
| 2013/0257776 A1* | 10/2013 | Tissot | 345/173 |

FOREIGN PATENT DOCUMENTS

| | | |
|---|---|---|
| JP | 2002-007059 | 1/2002 |
| JP | 2002-149336 | 5/2002 |
| JP | 2004-117052 | 4/2004 |
| JP | 2005-275632 | 10/2005 |
| JP | 2006-146524 | 6/2006 |

* cited by examiner

FIG.4
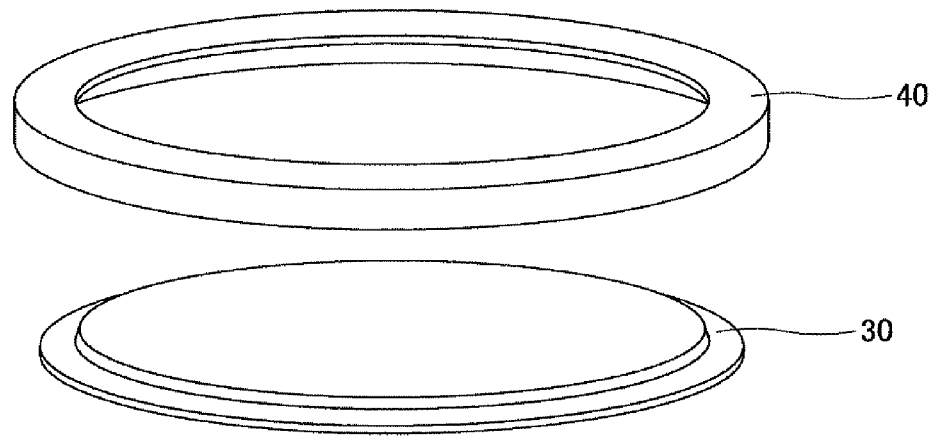
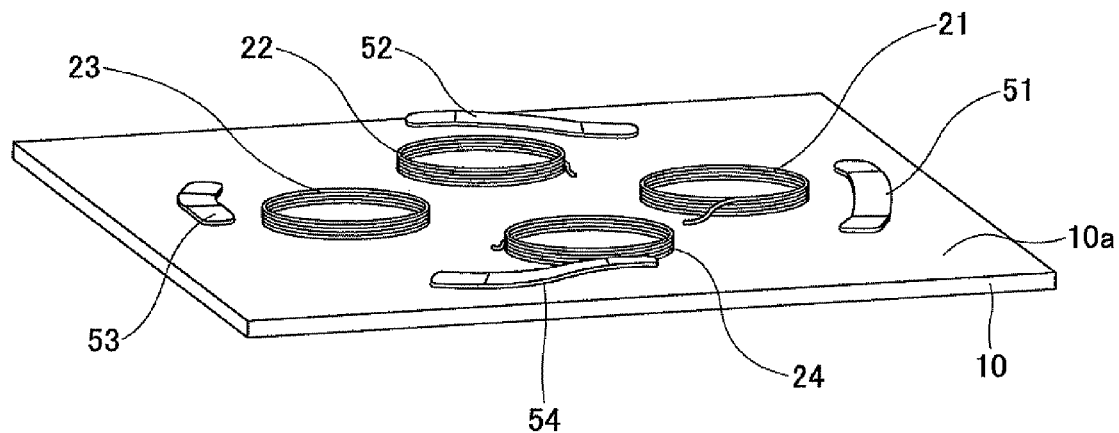
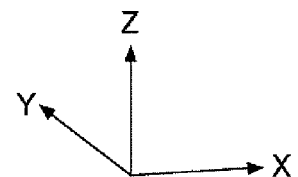

OPERATION INPUT DEVICE AND METHOD OF CONTROLLING SAME

CROSS-REFERENCE TO RELATED APPLICATION

The present application is based upon and claims the benefit of priority of Japanese Patent Application No. 2009-244805, filed on Oct. 23, 2009, the entire contents of which are incorporated herein by reference.

BACKGROUND OF THE INVENTION

1. Field of the Invention

The present invention relates generally to operation input devices that receive an operator's input and methods of controlling the same, and more particularly to an operation input device configured to provide an operator with vibrations and a method of controlling the same.

2. Description of the Related Art

Conventionally, an input device is known that detects an input position and a pressure at the time of pressing with an operator's finger using a resistive touchscreen panel and provides the touchscreen panel with vibrations. (See, for example, Japanese Laid-Open Patent Application No. 2005-275632.) This input device detects the input position and the pressure with a voltage measuring circuit while providing a user with vibrations using a vibrating motor.

SUMMARY OF THE INVENTION

According to one aspect of the present invention, an operation input device configured to receive a force includes a base part including a placement surface on which an inductor is placed; a displacement member including a first surface facing the placement surface and a second surface configured to receive an application of the force, the displacement member being configured to cause an inductance of the inductor to vary with an approach of the first surface to the placement surface due to the application of the force on the second surface; a support member configured to support the displacement member in such a manner as to allow a displacement of the displacement member; a detection part configured to detect a variation in the inductance by feeding a first pulse signal to the inductor; and a control part configured to generate a magnetic field to displace the second surface by feeding a second pulse signal to the inductor, the second pulse signal being different in phase from the first pulse signal.

According to one aspect of the present invention, a method of controlling an operation input device includes detecting a variation in an inductance of an inductor placed on a placement surface of a board by feeding a first pulse signal to the inductor, the variation in the inductance being caused by an approach of a first surface of a displacement member to the placement surface due to an application of a force on a second surface of the displacement member; and generating a magnetic field to displace the second surface of the displacement member by feeding a second pulse signal to the inductor, the second pulse signal being different in phase from the first pulse signal.

The objects and advantages of the invention will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 4 is an exploded perspective view of the first example of the operation input device in which return springs are provided according to the embodiment of the present invention;

DETAILED DESCRIPTION OF THE PREFERRED EMBODIMENTS

As described above, an input device is known that detects the input position and the pressure using a resistive touchscreen panel and provides the touchscreen panel with vibrations. According to this conventional technique, however, the function of detecting an operator's force and the function of providing the operator with vibrations are implemented with separate configurations independent of each other, so that the input device is likely to be large in size. Further, the configuration for implementing the vibration providing function is complicated.

According to one aspect of the present invention, an operation input device and a method of controlling the operation input device are provided that implement the function of detecting an operator's force and the function of providing the operator with vibrations with a simple configuration.

A description is given below, with reference to the accompanying drawings, of an embodiment of the present invention.

Normally, the following relational expression holds with respect to the inductance L of an inductor such as a coil (winding):

$$L = K\mu n^2 S/l,$$

where K is a coefficient, $\mu$ is magnetic permeability, n is the number of turns of the coil, S is the cross-sectional area of the coil, and l is the magnetic path length of the coil.

As is clear from this relational expression, the inductance is caused to vary by a change in the ambient magnetic permeability or a change in the magnetic path length if the shape-dependent parameters, that is, the number of turns and the cross-sectional area of the coil, are fixed. In an operation input device according to the embodiment of the present invention, this variation in inductance is used.

The operation input device of this embodiment is configured to receive (accept) an operator's force input from a z-axial direction of a Cartesian coordinate system defined by the x-axis, y-axis, and z-axis. The z-axial direction refers to a direction parallel to the z-axis. The operator's force is detected based on a predetermined signal that varies with variations in inductance.

Further, the operation input device of this embodiment causes a current that generates a magnetic field around an inductor to flow through the inductor. The magnetic field thus generated causes a displacement that serves to simulate the operator to an operation surface on which the operator's force is applicable.

Figure 1A:
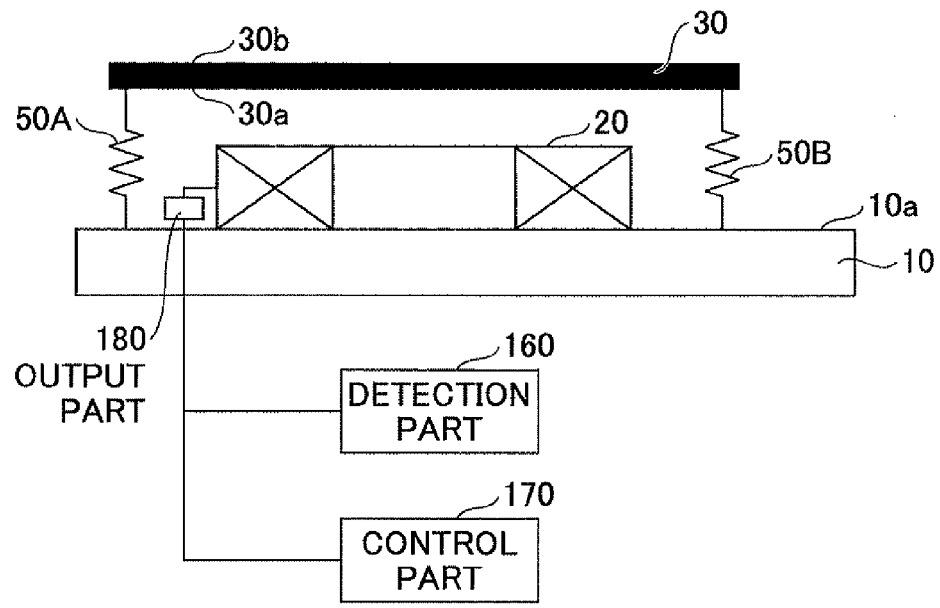
FIGS. 1A and 1B are diagrams for illustrating an operation input device according to an embodiment of the present invention.
Figure 1B:
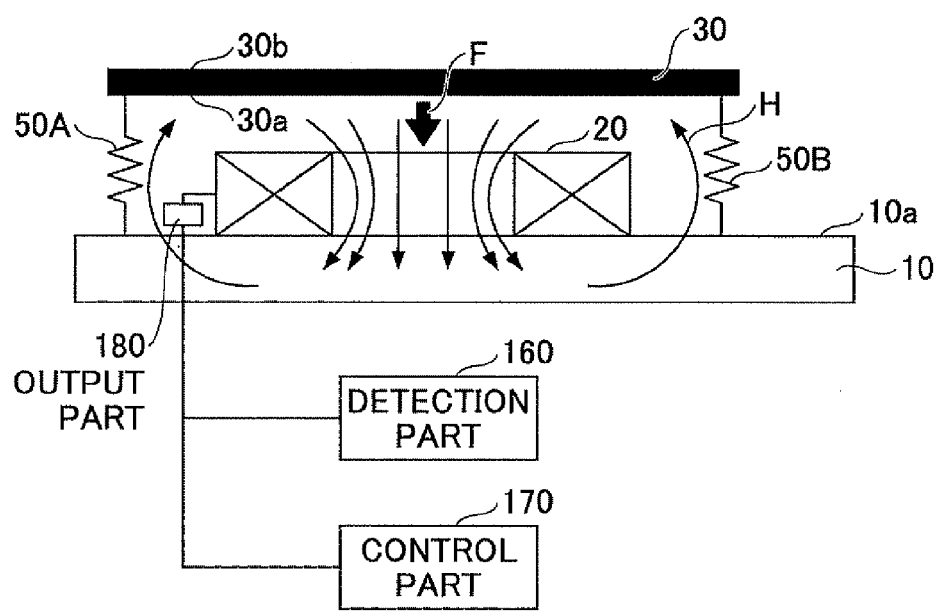

FIGS. 1A and 1B, which are diagrams for illustrating the operation input device of this embodiment, are side views of the operation input device, in which part of the configuration of the operation input device is illustrated with a cross section. FIG. 1A illustrates an initial state where no magnetic field for causing an operator to feel a displacement of an operation surface 30b is generated. FIG. 1B illustrates a state where a magnetic field for causing the operator to feel a displacement of the operation surface 30b is generated. The operation input device of this embodiment includes a board 10, an inductor 20, a displacement member 30, support members 50A and 50B, a detection part 160, and a control part 170.

The board 10 is a base part including a placement surface 10a on which the inductor 20 is placed. The inductor 20 is illustrated in a cross-sectional view of a coil inductor.

The displacement member 30, which is provided on a side from which the operator's force is input relative to the board 10, includes an opposed surface 30a (first surface) facing (opposed to) the placement surface 10a and the operation surface 30b (second surface) on which the operator's force is applicable. The displacement member 30 is configured to cause the inductance of the inductor 20 to vary with the approach of the opposed surface 30a to the placement surface 10a due to application of the operator's force on the operation surface 30b. A magnetic circuit is formed between the displacement member 30 and the inductor 20. For example, part or all of the displacement member 30 is formed of a material higher in magnetic permeability than air.

The support members 50A and 50B support the displacement member 30 so that the displacement member 30 may vary in such a manner as to vary the interval (distance) between the opposed surface 30a and the placement surface 10a. For example, the support members 50A and 50B support the displacement member 30 so that the interval between the opposed surface 30a and the placement surface 10a changes elastically. By way of example, the support members 50A and 50B may be spring members, rubber members, sponge members, or cylinders filled with air or oil. For example, adoption of spring members makes it possible to reduce weight and simplify a structure, while employment of rubber members makes it possible to provide insulation. The support members 50A and 50B may also be viscous members having viscosity.

The detection part 160 is configured to detect a variation in the inductance of the inductor 20 by feeding a first pulse signal to the inductor 20. The detection part 160 detects a variation in the inductance of the inductor 20 based on, for example, a pulse voltage (first pulse voltage) generated across the inductor 20 by the feeding of a pulse current corresponding to the first pulse signal (a first pulse current) to the inductor 20. The position of an application point on the operation surface 30b and the displacement (amount) of the displacement member 30 may be calculated based on the detection result of the variation of the inductance of the inductor 20.

The control part 170 causes a magnetic field H that displaces the operation surface 30b to be generated by feeding the inductor 20 with a second pulse signal different in phase from the first pulse signal. The magnetic field H generated by the flowing of a pulse current corresponding to the second pulse signal (a second pulse current) through the inductor 20 generates an attraction force F that attracts the displacement member 30 to the inductor 20. The displacement member 30 having the operation surface 30b is caused to vibrate by a variation in the magnitude of the attraction force F generated by the feeding of the second pulse signal to the inductor 20. That is, the second pulse signal, which varies temporarily in amplitude, is thus capable of varying the magnitude of the attraction force F.

The displacement of the operation surface 30b is caused by the displacement of the displacement member 30 due to the magnetic field H. If the attraction force F due to the magnetic field H is lost or reduced, the displacement member 30 is caused to return to its initial state illustrated in FIG. 1A by the force (for example, elastic force) of the support members 50A and 50B to press back the displacement member 30. Accordingly, the displacement member 30 and the operation surface 30b are caused to vibrate by the control part 170 causing the magnitude of the attraction force F due to the magnetic field H to vary continuously. The vibrations of the displacement member 30 and the operations surface 30b are not limited to vibrations of two or more back-and-forth motions, and may be vibrations of a single back-and-forth motion.

The first pulse signal and the second pulse signal may be square waves, triangle waves, or sawtooth waves.

Accordingly, in the case of the operation input device of this embodiment illustrated in FIGS. 1A and 1B, it is possible to detect a force and generate vibrations by feeding the same inductor 20 with the first pulse signal and the second pulse signal different in phase from each other. That is, both the function of detecting an operator's force and the function of providing the operator with vibrations may be implemented with a simple configuration of feeding the inductor 20 with two kinds of pulse signals without forming a complicated structure. Further, a component (the inductor 20) may be shared between a configuration for detecting the operator's force and a configuration for providing the operator with vibrations. Accordingly, it is possible to reduce size and costs.

Next, a description is given of examples of the operation input device and their controlling methods according to the embodiment of the present invention.

Figure 2:
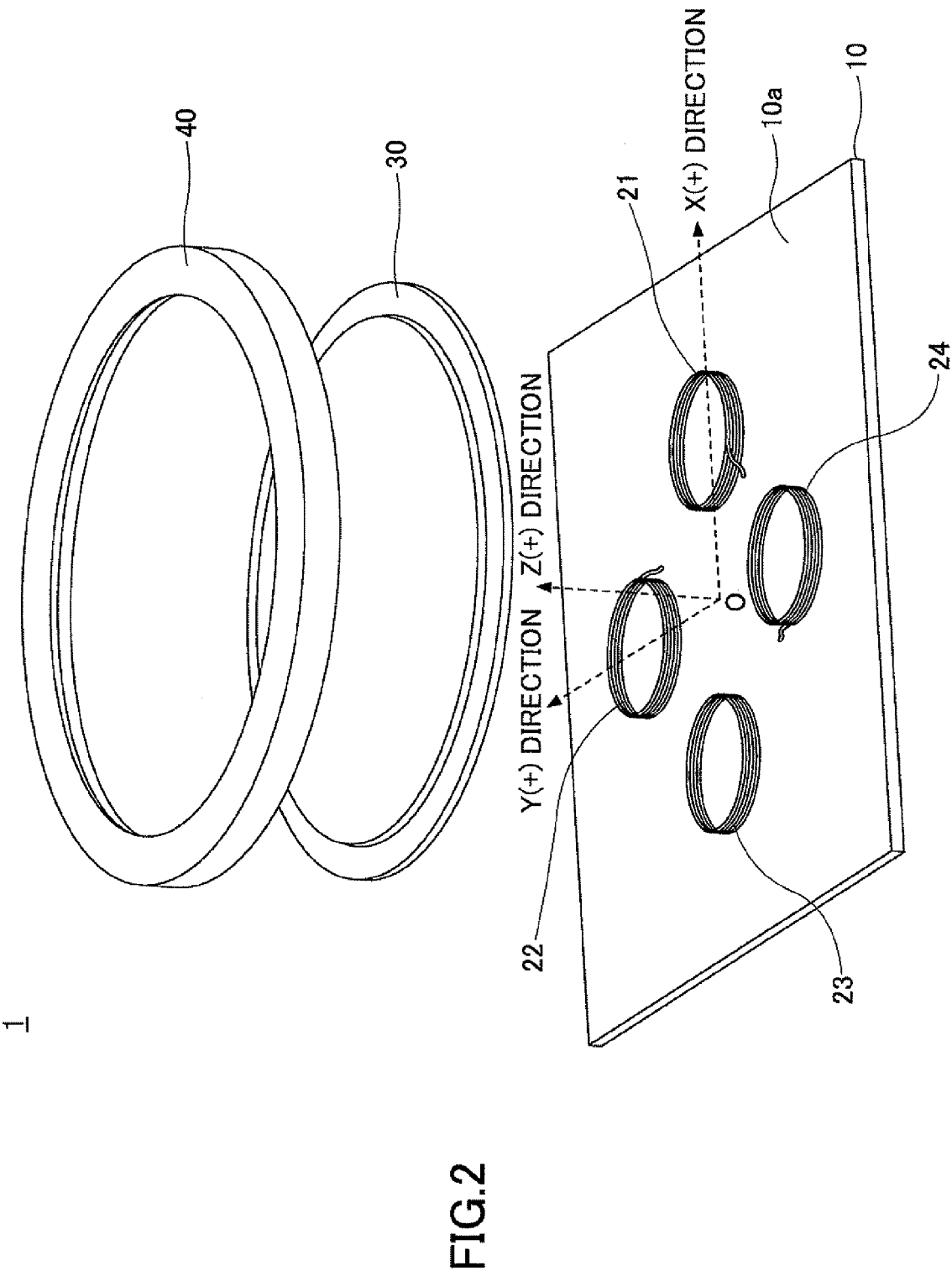
FIG. 2 is an exploded perspective view of a first example of the operation input device according to the embodiment of the present invention.
Figure 3:
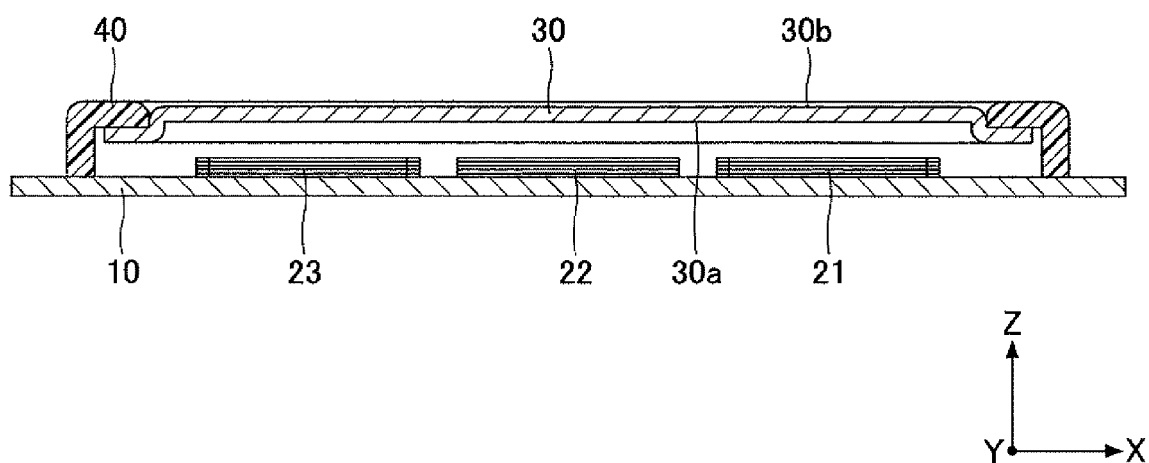
FIG. 3 is a cross-sectional view of the first example of the operation input device according to the embodiment of the present invention.

FIG. 2 is an exploded perspective view of an operation input device 1, which is a first example of the operation input device of this embodiment. FIG. 3 is a cross-sectional view of the operation input device 1.

In the following description, the same elements as those of FIGS. 1A and 1B are referred to by the same reference numerals.

The operation input device 1 includes the board 10 including the placement surface 10a on which multiple inductors (four coils 21, 22, 23, and 24 in the case of FIG. 2) are placed. The board 10 is a base part having a placement surface parallel to an x-y plane. The origin O, which is the point of reference of a three-dimensional Cartesian coordinate system, is set at a position a predetermined distance away from the placement surface 10a to a side from which an operator's force is input (the upper side relative to the board 10 in the case of FIG. 2). The board 10 may be a resin board, but may also be a steel plate having sheet steel or silicon sheet steel as a base material in order to serve as a yoke.

The coils 21 through 24 are arranged in a circumferential direction of a virtual circle formed by connecting points equidistant from the origin O. It is preferable that the coils 21 through 24 be equally spaced in the circumferential direction in terms of facilitating calculation of the vectors of an operator's force. If the coils 21 through 24 have the same characteristics, the coils 21 through 24 may be arranged to have the same distance between the centers of gravity of each adjacent two of the coils 21 through 24. The coils 21 through 24 are arranged 90° apart on the same circle to be positioned in the four directions of x(+), y(+), x(−), and y(−), respectively. The x(−) direction is at 180° from the x(+) direction in the x-y plane, and the y(−) direction is at 180° from the y(+) direction in the x-y plane. The coil 21 is placed on the positive side on the x-axis relative to the origin O, the coil 22 is placed on the positive side on the y-axis relative to the origin O, the coil 23 is placed on the negative side on the x-axis relative to the origin O, and the coil 24 is placed on the negative side on the y-axis relative to the origin O.

Further, the operation input device 1 includes the displacement member 30, which is a key in this example, provided on a side from which an operator's force is input relative to the board 10. The plate-shaped key 30 is placed above the coils 21 through 24 provided on the board 10. The key 30 includes the opposed surface 30a (the lower surface in FIG. 2) facing (opposed to) the placement surface 10a on which the coils 21 through 24 are placed and the operation surface 30b (the upper surface in FIG. 2) on which the operator's force is applicable. The key 30 is configured to cause the inductance of at least one of the four coils 21 through 24 to vary with the approach of the opposed surface 30a to the placement surface 10a on which the coils 21 through 24 are placed due to application of the operator's force on the operation surface 30b. In order to cause variations in the inductance of the coils 21 through 24, the key 30 may be at least formed of a material higher in magnetic permeability than air. The relative magnetic permeability of the key 30 is preferably higher than or equal to 1.001. The key 30 may be magnetic material such as iron or ferrite. The key 30 may also be resin mixed with powder of ferrite or the like.

The key 30 is supported by a case 40 so as to be movable in the z-axial directions. The case 40 supports the key 30 so as to allow the key 30 to move in a direction to approach the board 10 from its standby position with application of the operator's force on the operation surface 30b, the standby position being the position of the key 30 in a standby state (initial state) where there is no application of the operator's force on the operation surface 30b. The case 40 is fixed to the board 10.

Figure 5:
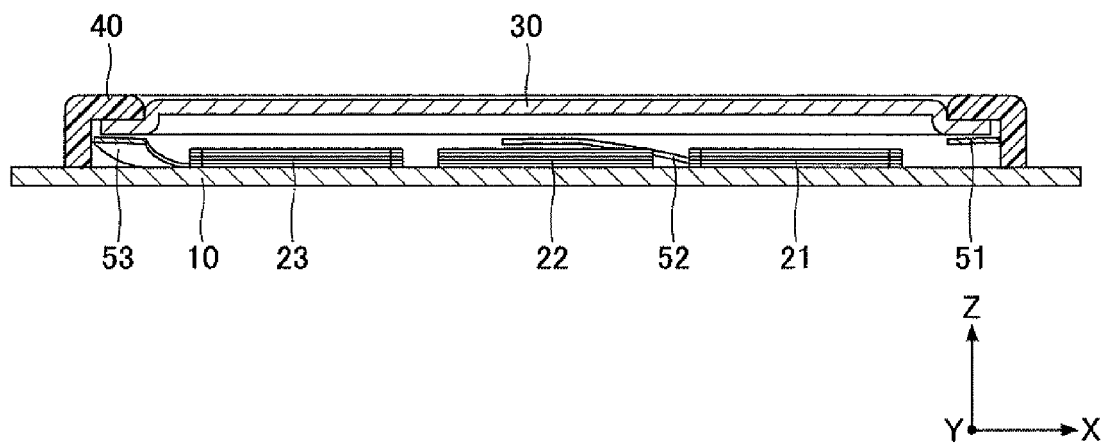
FIG. 5 is a cross-sectional view of the first example of the operation input device in which the return springs are provided according to the embodiment of the present invention.
Figure 6:
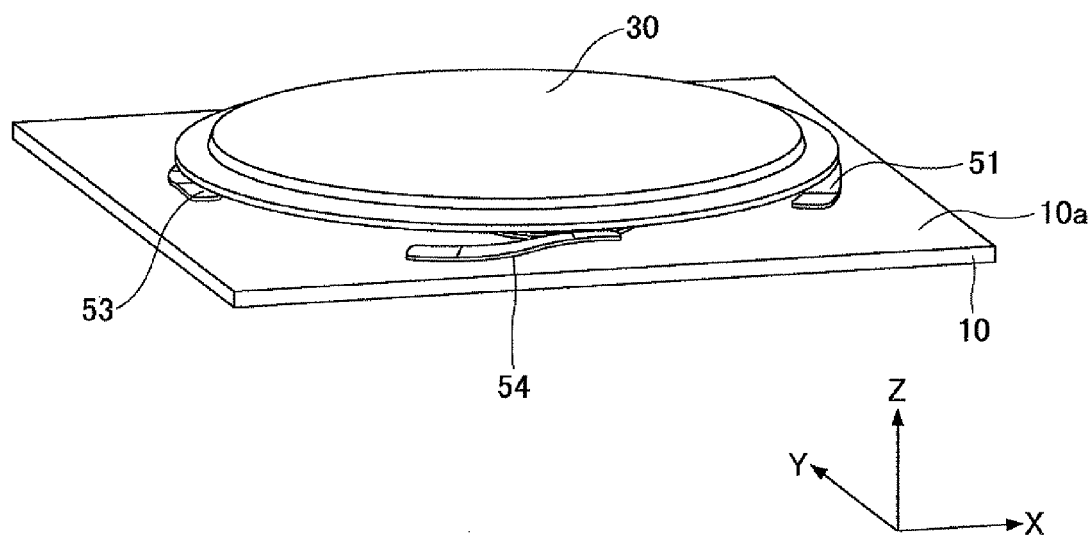
FIG. 6 is a perspective view of the first example of the operation input device where a key is placed on the return springs according to the embodiment of the present invention.

Further, the operation input device 1 includes an elastic support member configured to elastically support the key 30 in directions in which the opposed surface 30a of the key 30 and the placement surface 10a of the board 10 face each other, so that the interval (distance) between the opposed surface 30a and the placement surface 10a changes elastically. For example, return springs 51, 52, 53, and 54 for returning the key 30 to its standby position may be provided outside (to surround) the coils 21 through 24 on the placement surface 10a of the board 10 as the elastic support member as illustrated in FIG. 4, FIG. 5, and FIG. 6. The return springs 51 through 54 are plate-shaped elastic bodies.

The elastic support member may be provided between the placement surface 10a of the board 10 and the opposed surface 30a of the key 30. The elastic support member is configured to elastically support the key 30 in such a manner as to prevent application of the operator's force from causing the key 30 to come into contact with any of the coils 21 through 24. The elastic support member supports the key 30 in such a manner as to allow the key 30 to be inclined relative to the x-y plane perpendicular to the z-axis and to move in the z-axial directions. Further, the elastic support member may also support the key 30 with the opposed surface 30a of the key 30 being urged in a direction away from the placement surface 10a of the board 10.

The elastic support member is configured to elastically support the key 30 so that the operation surface 30b of the key 30 is parallel to the x-y plane with no application of the operator's force on the operation surface 30b. The operation surface 30b of the key 30 may be a flat surface or a surface formed to be concave or convex relative to the x-y plane. By changing the shape of the operation surface 30b as desired, it is possible to improve operability for the operator. Further, the operation surface 30b of the key 30 may be circular, elliptical, or polygonal.

Further, the operation input device 1 includes an output part 180 (FIGS. 1A and 1B) configured to output an output signal generated by a change in the inductance of at least one of the coils 21 through 24 to the detection part 160 (FIGS. 1A and 1B). This output part 180 is provided for each of the coils 21 through 24 so that variations in inductance caused in the coils 21 through 24 may be detected on a coil-by-coil basis. The output part 180 is electrically connected to an end portion of each of the coils 21 through 24. For example, an interconnect connected to the end portion of each of the coils 21 through 24 and a terminal connected to the interconnect may be provided as the output part 180. In this case, each terminal is connected to the detection part 160.

Figure 7:
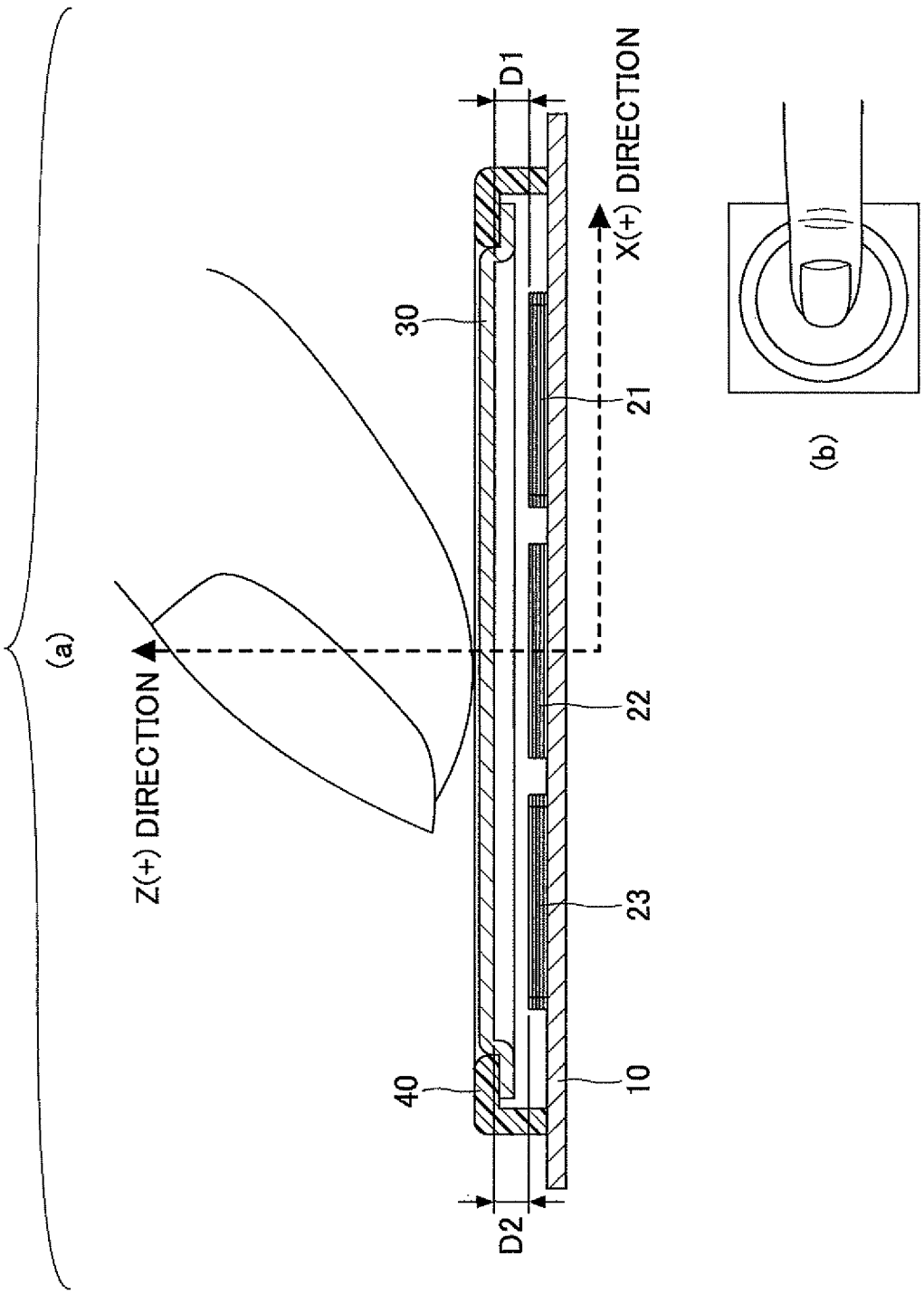
FIG. 7 is a cross-sectional view of the first example of the operation input device where an operator's finger is placed on the key according to the embodiment of the present invention.
Figure 8:
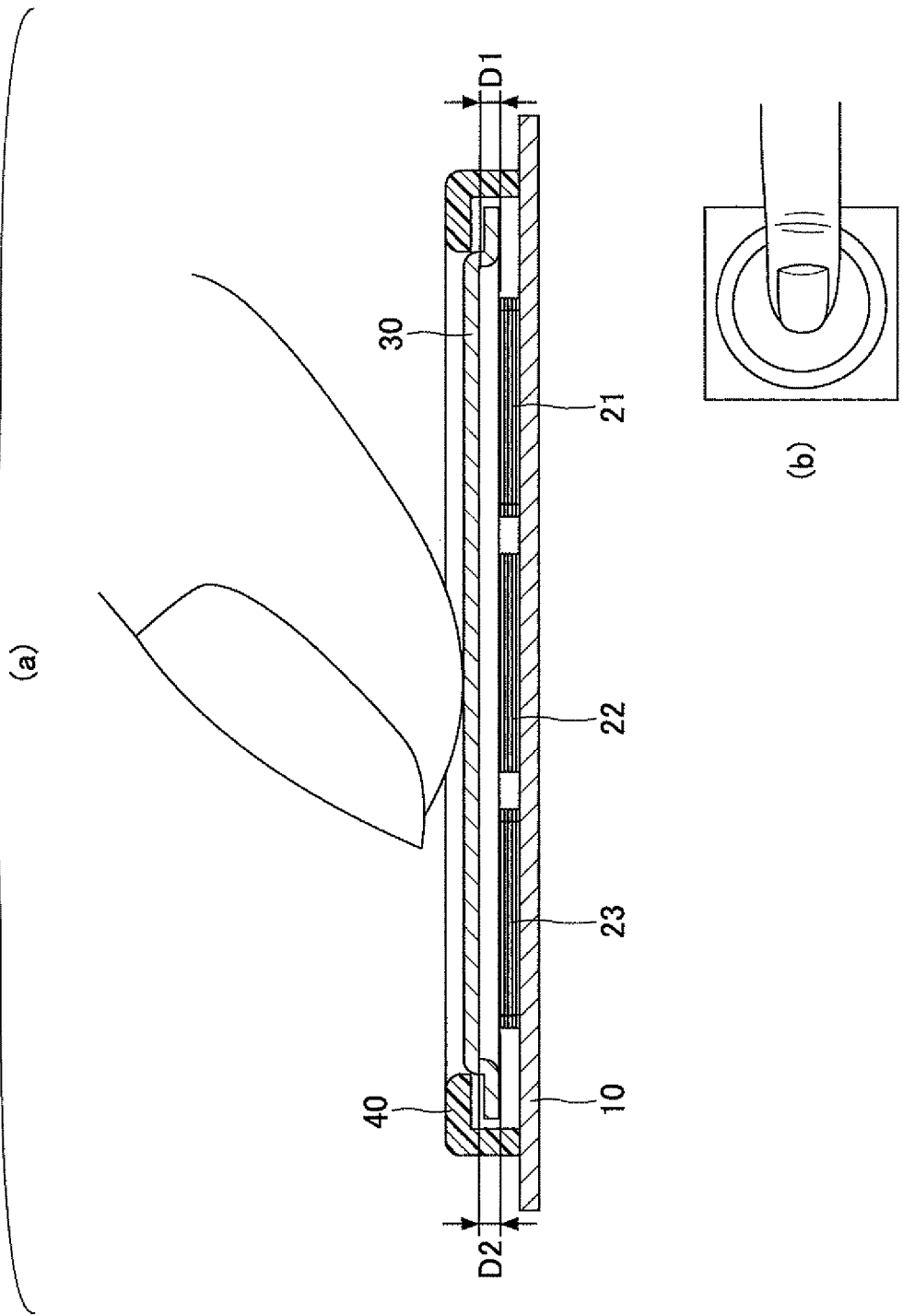
FIG. 8 is a cross-sectional view of the first example of the operation input device where the center of the key is pressed according to the embodiment of the present invention.
Figure 9:
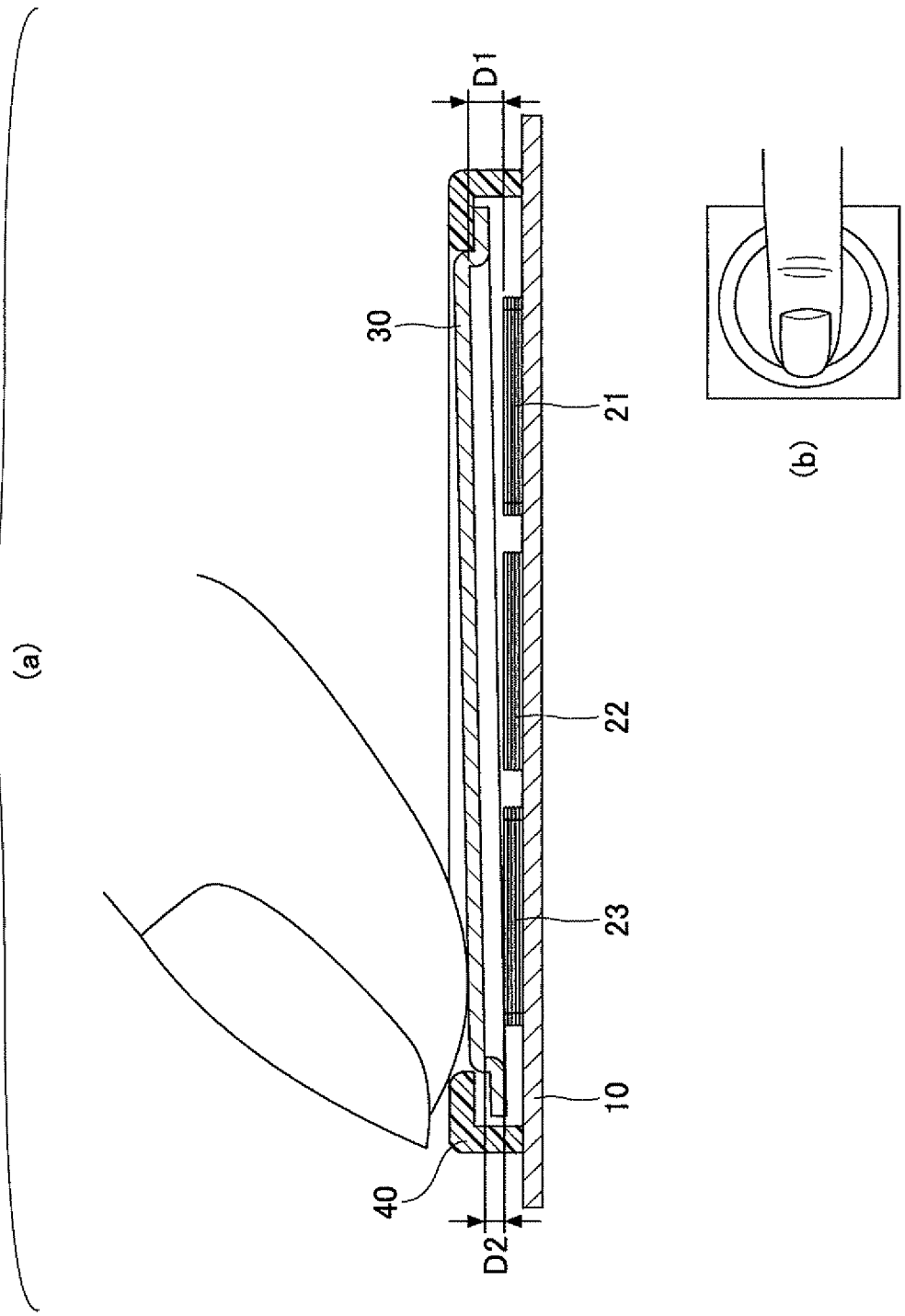
FIG. 9 is a cross-sectional view of the first example of the operation input device where the key is pressed at a position in an x(−) direction according to the embodiment of the present invention.

FIG. 7, FIG. 8, and FIG. 9 are diagrams for illustrating states of the operation input device 1 at the time of the operator operating the operation input device 1. In each of FIG. 7, FIG. 8, and FIG. 9, (b) illustrates the position of a finger on the operation surface 30b of the key 30.

FIG. 7 illustrates a state where the operator is placing a finger on the operation surface 30b, which is the rear surface of the key 30, without applying force. There is no change in the inductance of each of the coils 21 through 24 in the standby state of FIG. 7 where there is no downward pressing of the key 30 with a finger of the operator.

FIG. 8 illustrates a state where a center portion of the operation surface 30b of the key 30 is pressed. In the state of FIG. 8, the distances between the key 30 and the coils 21 through 24 (indicated by D1 and D2 in (a) of FIG. 8) are reduced so that the inductance of each of the coils 21 through 24 increases. The distance D1 indicates a distance in the z-axial directions on the x(+) direction side, which is the positive side of the x-axis. The distance D2 indicates a distance in the z-axial directions on the x(−) direction side, which is the negative side of the x-axis. The amount of pressing of the key 30 at a position in the x-axial directions may be detected based on the difference between the inductance of the coil 21 and the inductance of the coil 23. The amount of pressing of the key 30 at a position in the y-axial directions may be detected based on the difference between the inductance of the coil 22 and the inductance of the coil 24. These amounts of pressing may be detected as analog values. In the state of FIG. 8, the differences in inductance between the x-axis directions and the y-axis directions, which are zero or less than or equal to a preset detection threshold, are determined to be zero. However, by also calculating the sum of the inductances of the coils 21 through 24 at the same time, it is possible to detect the pressing of the center portion of the operation surface 30b of the key 30 on the z-axis. The amount of pressing of the key 30 with the center portion of its operation surface 30b being pressed may also be detected as an analog value.

FIG. 9 illustrates a state where the key 30 is pressed on the x(−) direction side (D2<D1). In the state of FIG. 9, it is possible to detect the presence of the point of application of pressing at a position in the x(−) direction on the operation surface 30b of the key 30 based on the difference between the inductance of the coil 21 and the inductance of the coil 23.

A description is given, with reference to FIG. 10 through FIG. 13, of a method of calculating a direction in which a force is input relative to the origin O (a position of input in the x-y plane) and the magnitude of the force (the amount of pressing in the z-axial directions). The detection part 160 (FIGS. 1A and 1B) calculates the position of input of a force in the x-y plane and the amount of pressing in the z-axial directions based on evaluation values representing a change in the x-directional component and a change in the y-directional component, respectively, of inductance.

Figure 10:
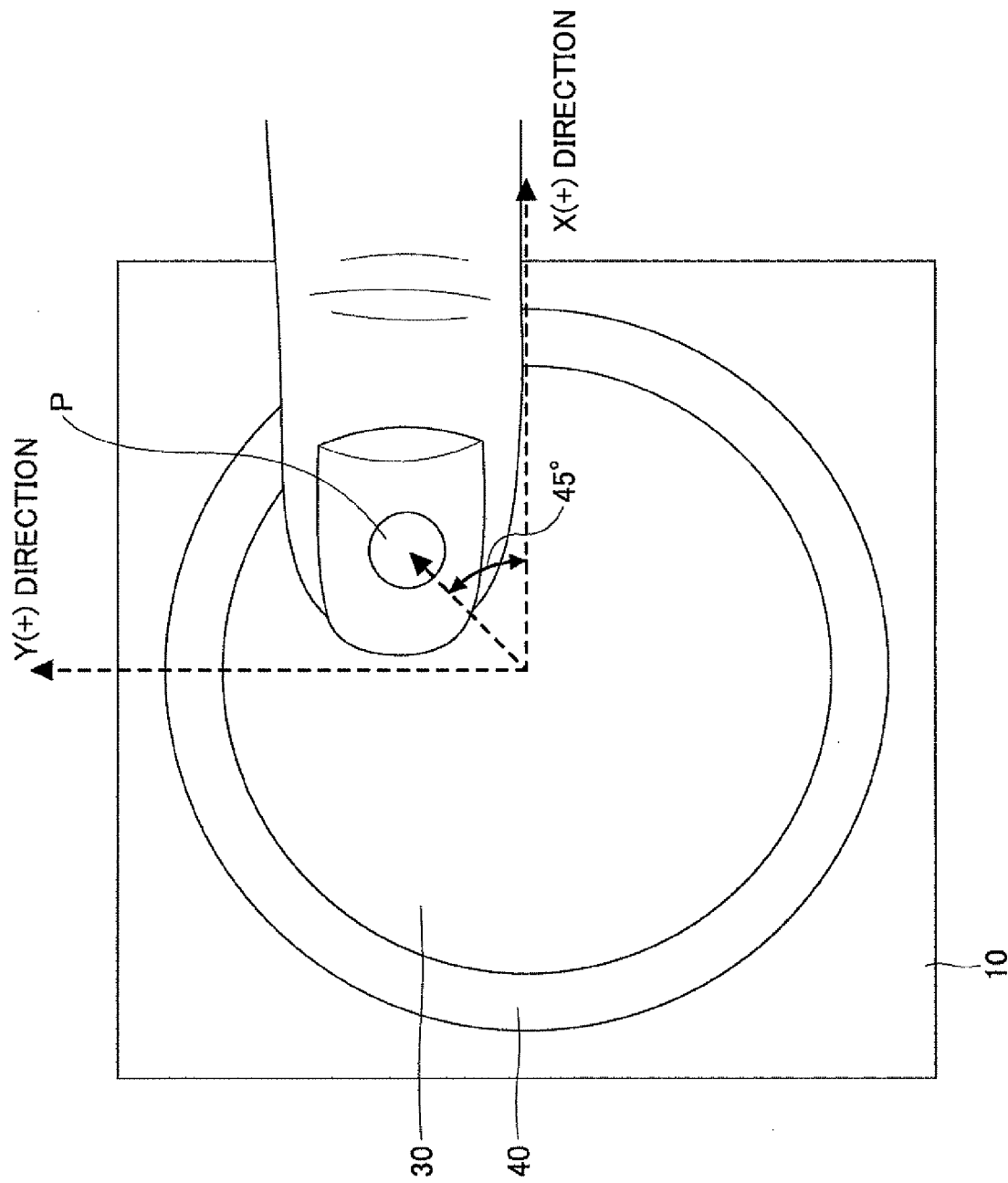
FIG. 10 is a plan view of the first example of the operation input device where a finger is placed at a position in a 45° direction in the x-y plane according to the embodiment of the present invention.

As illustrated in FIG. 10, in the case of operating the key 30 by pressing a position P (a point of application on the operation surface 30b of the key 30) in a direction of 45° in the x-y plane with a finger, a change (difference) in inductance is caused in each of the x-directional component and the y-directional component.

It is possible to increase calculation accuracy and reduce calculation time by correcting or normalizing in advance the amount of change in inductance due to application of the operator's force. Therefore, the inductances of the four coils 21 through 24 in the state where there is no pressing in any direction in the x-y plane (standby state) and in the state of a full stroke are prestored in a memory. The inductances stored in the memory may be values preset based on design values or values actually measured at the time of manufacturing, or may be measured based on an instruction signal from a user at the time of use by the user. Further, the maximum value of each inductance during use may be learned. Detected values of inductance vary between the minimum value in the standby state and the maximum value in the full-stroke state thus obtained. In measuring inductance in each direction in the x-y plane, the inductance may be evaluated on a coil-by-coil basis or a difference in inductance between opposed two of the coils 21 through 24 may be evaluated. The amount of change in inductance of each of the coils 21 through 24 in response to pressing by the operator is corrected or normalized using these minimum and maximum values.

A description is given of a calculation for detecting the direction of pressing (a position at which pressing is performed) and the amount of pressing in the x-y plane, taking, as an example, a case where pressing is performed with a component in each of the x(+) direction and the y(+) direction as illustrated in FIG. 10.

The amount of change in the x-directional component of inductance is detected based on an x-directional difference value, which is a difference between the corrected or normalized amount of change in inductance of the coil 21 placed in the x(+) direction and the corrected or normalized amount of change in inductance of the coil 23 placed in the x(−) direction. Likewise, the amount of change in the y-directional component of inductance is detected based on a y-directional difference value, which is a difference between the corrected or normalized amount of change in inductance of the coil 22 placed in the y(+) direction and the corrected or normalized amount of change in inductance of the coil 24 placed in the y(−) direction. That is, the x-directional difference value corresponds to the evaluation value representing the amount of change in the x-directional component of inductance, and the y-directional difference value corresponds to the evaluation value representing the amount of change in the y-directional component of inductance.

Figure 11:
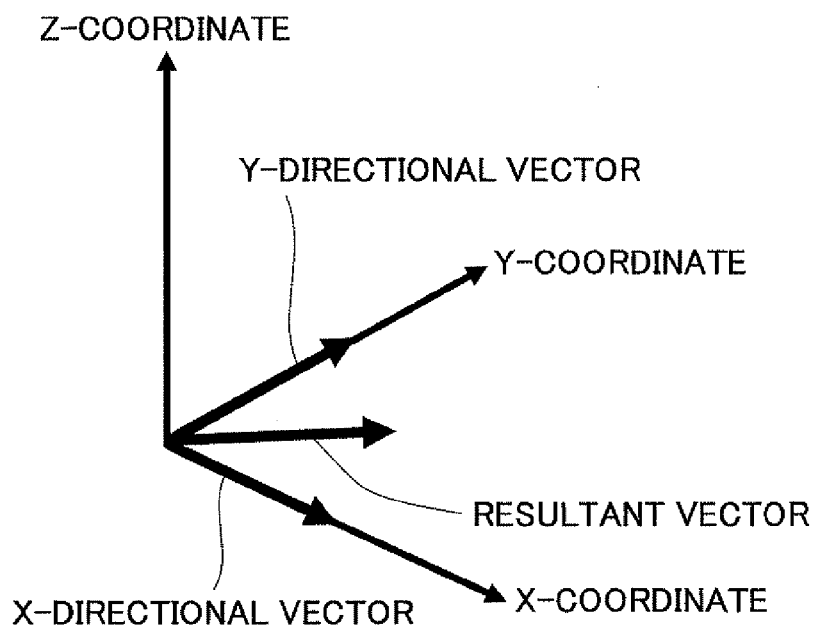
FIG. 11 is a vector diagram of a force in an xyz space according to the embodiment of the present invention.
Figure 12:
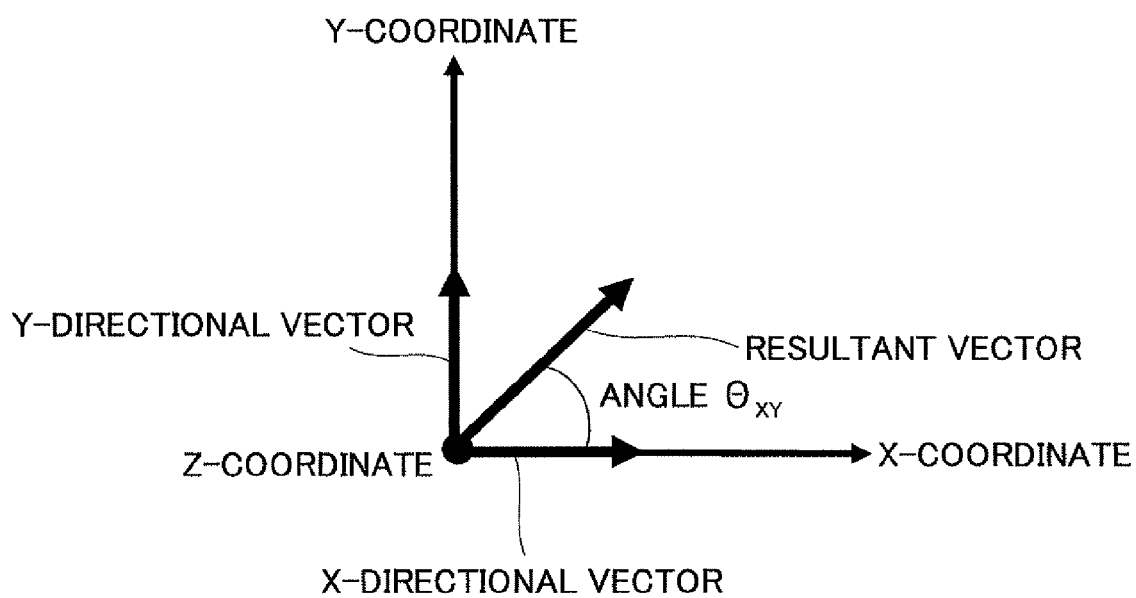
FIG. 12 is a vector diagram of the force in the xyz space according to the embodiment of the present invention.

For example, it is assumed that the x-directional difference value is calculated to be 0.5 and the y-directional difference value is calculated to be 0.5 in the state of FIG. 10 in the case where the above-described correction or normalization is performed so that the maximum value of the x-directional difference value and the maximum value of the y-directional difference value are both 1. These two evaluation values are determined as an x-coordinate vector and a y-coordinate vector. Then, as illustrated in FIG. 11, a vector resulting from the composition of the two vectors is calculated in the x-y plane. As illustrated in FIG. 12, the angle formed by this resultant vector in the x-y plane with a reference direction (for example, the x(+) direction) is determined as $\Theta_{XY}$. That is, the vector length of the resultant vector corresponds to the amount of pressing, and the vector angle $\Theta_{XY}$ corresponds to the direction of input force.

In the case of this example, the vector length of the resultant vector is 0.707 ($=\sqrt{(0.5^2+0.5^2)}$), and the vector angle $\Theta_{XY}$ is 45° ($=\tan^{-1}(0.5/0.5)$). A method like this makes it possible to detect all 360° directions and to detect the amount of pressing. Further, it is possible to detect pressing in the z-axial (z(−)) direction by calculating the sum of the inductances and determining the sum as an evaluation value for the amount of pressing of the entire key 30 in order to detect the case of pressing in the z-axial (z(−)) direction.

Figure 13:
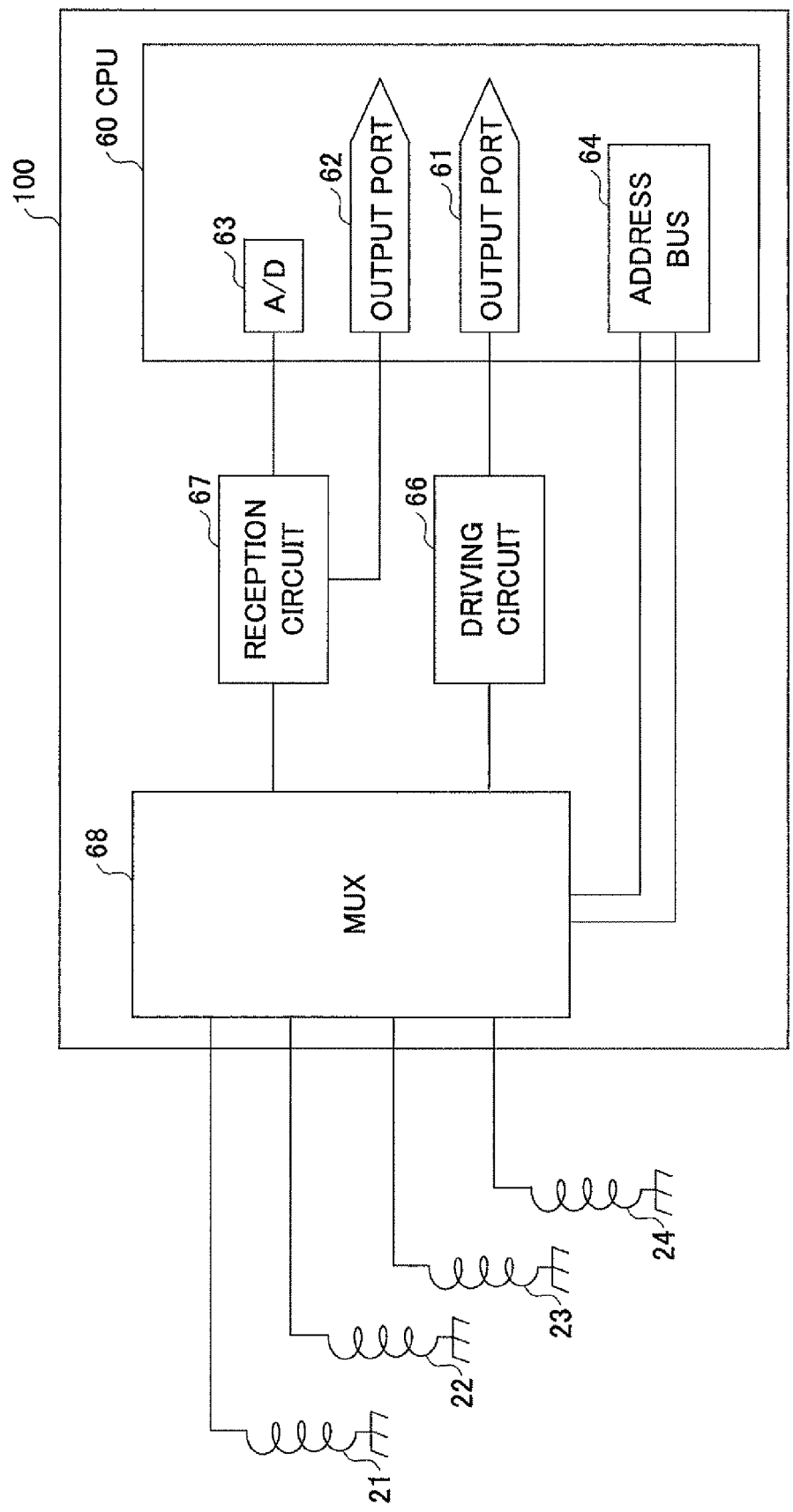
FIG. 13 is a block diagram illustrating an inductance detecting circuit configured to detect inductance variations according to the embodiment of the present invention.

FIG. 13 is a block diagram illustrating an inductance detecting circuit 100 configured to detect a change (variation) in inductance. The inductance detecting circuit 100 is a calculation part configured to detect a change in the inductance of each of the coils 21 through 24. The inductance detecting circuit 100 includes a CPU 60, which is a computation part, a driving circuit 66 connected to a first output port 61 of the CPU 60, a multiplexer (MUX) 68 connected to first ends of the coils 21 through 24, whose second ends are grounded, and a reception circuit 67, which is connected to a second output port 62 and an A/D port 63 of the CPU 60. The multiplexer 68 connects the coils 21 through 24 on the board 10 to the CPU 60 through the shared reception circuit 67 and driving circuit 66. The connection destination of the multiplexer 68 is switched (uniquely selected) by addressing from the CPU 60 through an address bus 64. Accordingly, the inductances of the coils 21 through 24 are detected sequentially at different detection points (times) on a coil-by-coil basis.

Figure 14:
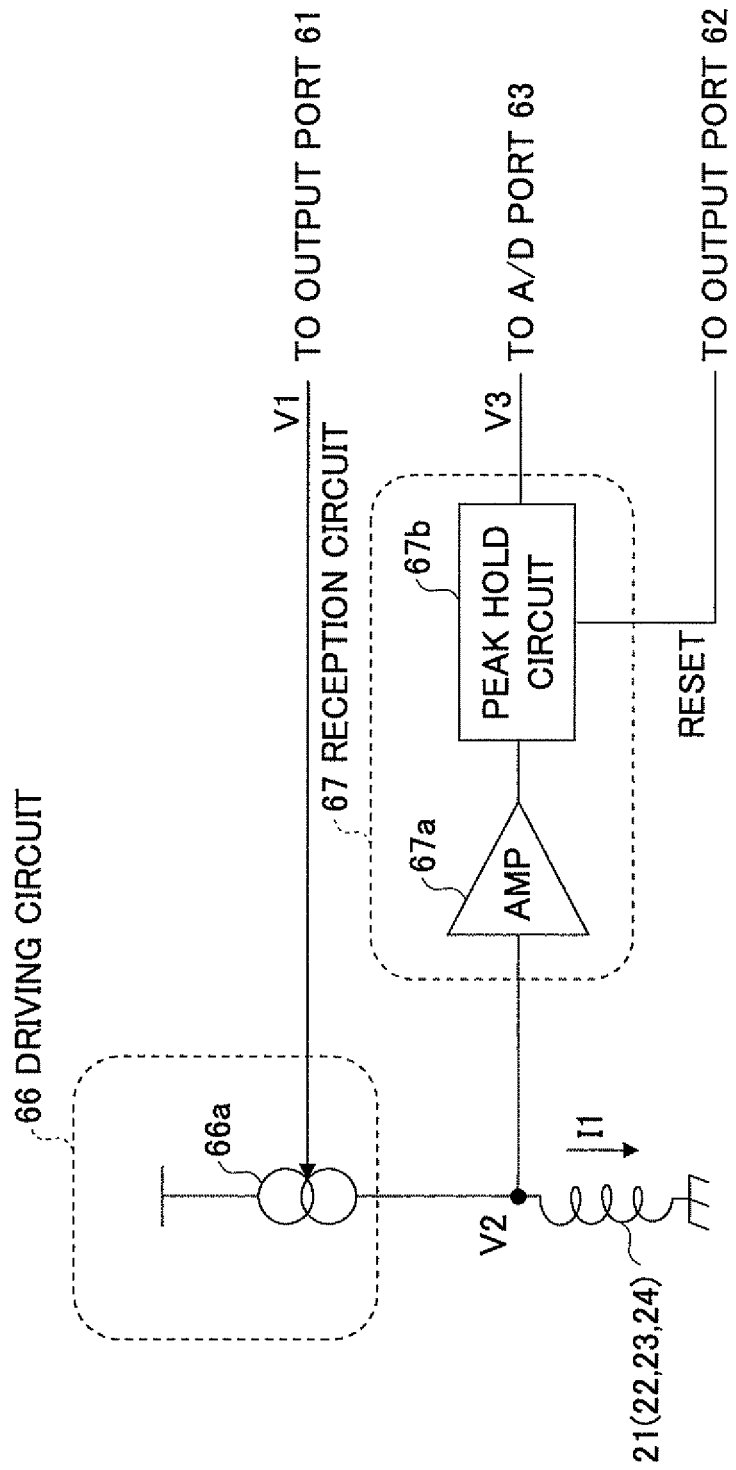
FIG. 14 is a block diagram illustrating a driving circuit and a reception circuit of the inductance detecting circuit according to the embodiment of the present invention.

FIG. 14 is a block diagram of the driving circuit 66 and the reception circuit 67 in FIG. 13. The driving circuit 66 is configured to cause electric current to flow through each of the coils 21 through 24 by controlling the output current of a constant current source 66a in accordance with an output signal from the output port 61 of the CPU 60. The reception circuit 67 inputs the voltage generated as a result of causing electric current to flow through each of the coils 21 through 24 to a peak hold circuit 67b, which may be replaced with a bottom hold circuit, through an amplifier (AMP) 67a. A peak value (analog value) held by the peak hold circuit 67b is input to the A/D port 63 to be converted into a digital value by an A/D converter (not graphically illustrated).

Figure 15:
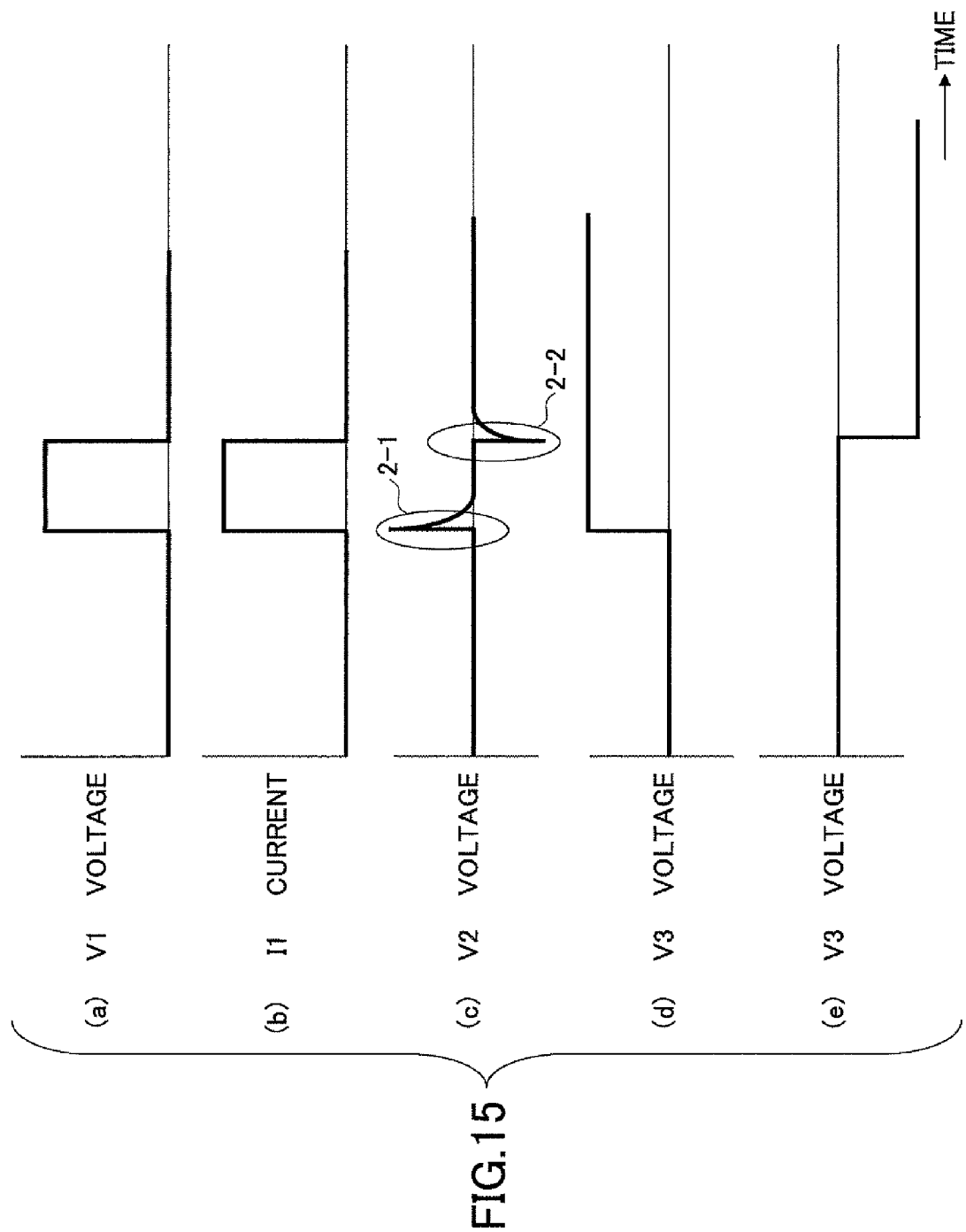
FIG. 15 is a chart of waveforms at respective points of FIG. 14 according to the embodiment of the present invention.

FIG. 15 is a diagram illustrating waveforms at respective points (V1, I1, V2, and V3) in FIG. 14. A voltage waveform of a square wave is output from the output port 61 of the CPU 60 as illustrated in (a) of FIG. 15. This voltage causes the constant current circuit 66a to cause a constant electric current to flow through the coil (representing any of the coils 21 through 24) ((b) of FIG. 15). Thereby, the coil generates a voltage V2 of a differentiated waveform as illustrated in (c) of FIG. 15. As the voltage waveform V2, a waveform 2-1 synchronizing with the rise of the voltage waveform V1 and a waveform 2-2 synchronizing with the fall of the voltage waveform V1 are obtained. The waveform 2-2 is opposite in polarity to the waveform 2-1. The amplifier 67a amplifies the voltage waveform V2 to a size suitable for the dynamic range of the A/D converter. By performing peak holding or bottom holding on the voltage waveform V2, the held value is taken into the A/D converter (the A/D port 63). (See (d) or (e) of FIG. 15.) The amplitude values of the waveforms 2-1 and 2-2 increase in proportion to the magnitude of the inductance of the coil. Accordingly, by detecting the amplitude value of the waveform 2-1 or 2-2, it is possible to evaluate the magnitude of the inductance of each of the coils 21 through 24.

Figure 16:
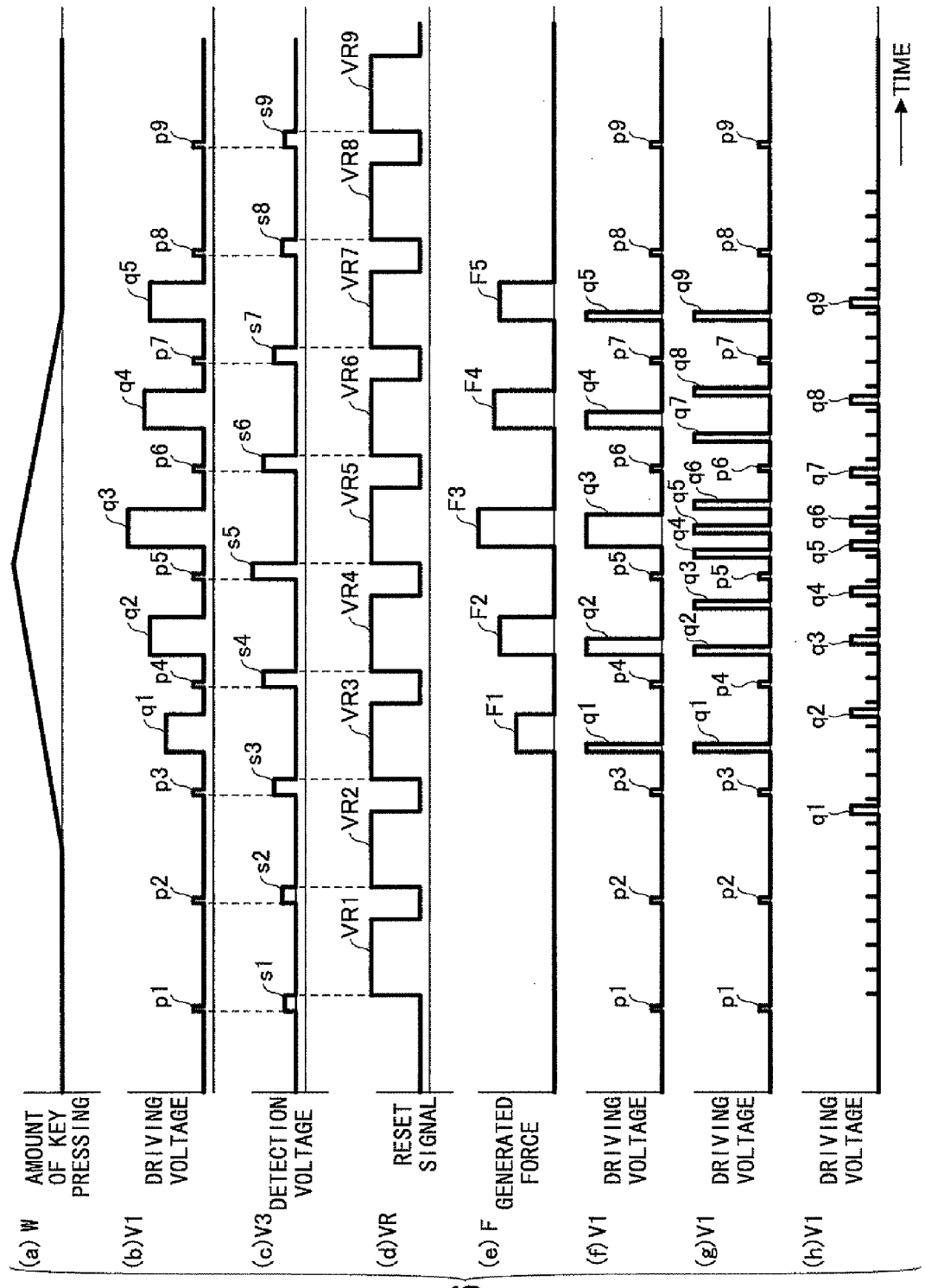
FIG. 16 is a chart of waveforms at a time of causing the first example of the operation input device to operate with a control method controlling the first example of the operation input device into the state illustrated in FIGS. 1A and 1B according to the embodiment of the present invention.

FIG. 16 is a chart of waveforms at the time of causing the operation input device 1 to operate with a control method that controls the operation input device 1 into the states illustrated in FIGS. 1A and 1B. The detection part 160 and the control part 170 correspond to the inductance detecting circuit 100 illustrated in FIG. 13. That is, the detection part 160 and the control part 170 are implemented with the single inductance detecting circuit 100. A description is given, in accordance with the waveform chart of FIG. 16, of a method of controlling the operation input device 1, referring to FIGS. 1A and 1B, FIG. 13, and FIG. 14 as well.

The method of controlling the operation input device 1 includes an inductance detecting step of detecting a change in the inductance of each of the coils 21 through 24 by feeding a first pulse signal to the coils 21 through 24 on a coil-by-coil basis. In the inductance detecting step, the CPU 60 of the inductance detecting circuit 100 outputs a pulse waveform p (pulses p1 through p9) from the output port 61 as the square-wave voltage waveform V1 as illustrated in (b) of FIG. 16, the pulse waveform p corresponding to the first pulse signal fed on a coil-by-coil basis. The pulses p1 through p9 are intermittently output to each of the coils 21 through 24 from the output port 61, so that the pulses of the first pulse signal are intermittently fed to each of the coils 21 through 24. Further, the inductance detecting step is repeated at regular intervals, so that the pulse waveform p (of the pulses p1 through p9) of the voltage waveform V1 is output at regular intervals. The pulse waveform p is a driving voltage for detecting a change in the inductance of each of the coils 21 through 24.

The driving voltage V1 causes a detection voltage V3 due to an increase in inductance to be generated as illustrated in (c) of FIG. 16 in accordance with the amount of pressing (displacement) W of the key 30 illustrated in (a) of FIG. 16. In the case where the amount of pressing W varies as illustrated in (a) of FIG. 16, the amplitude of the detection voltage V3 varies in proportion to the amount of pressing W. The amplitude of pulses s3, s4, and s5 of the detection voltage V3 increases as the amount of pressing W increases, and the amplitude of pulses s6 and s7 of the detection voltage V3 decreases as the amount of pressing W decreases. If there is no change in the amount of pressing W, the amplitude of the pulse waveform of the detection voltage V3 remains the same (pulses s1, s2, s8, and s9).

Further, the method of controlling the operation input device 1 includes a magnetic field generating step of generating the magnetic field H to displace the operation surface 30b of the key 30 by feeding a second pulse signal to the coils 21 through 24 on a coil-by-coil basis, the second pulse signal being different in phase from the first pulse signal fed in the inductance detecting step. In the magnetic field generating step, the CPU 60 outputs a pulse waveform q (pulses q1 through q5) from the output port 61 as the square-wave voltage waveform V1 as illustrated in (b) of FIG. 16, the pulse waveform q corresponding to the second pulse signal fed on a coil-by-coil basis. The pulse waveform q is output to each of the coils 21 through 24, so that the second pulse signal is fed to teach of the coils 21 through 24. With the outputting of the pulse waveform q, the attraction force F is generated to attract the key 30 to the coil side as illustrated in (e) of FIG. 16.

FIG. 16 illustrates a control method that outputs pulses q1 through q5 in accordance with the amplitude of the detection voltage V3, which is the result of detection of inductance variations. That is, if the amplitude of the detection voltage V3 is less than a predetermined threshold, no pulse waveform q is output. If the amplitude of the detection voltage V3 is more than or equal to the predetermined threshold, the pulse waveform q corresponding to the amplitude of the detection voltage V3 is output. That is, the pulse waveform q to cause a displacement of the operation surface 30b in accordance with the amount of pressing W is generated with amplitude proportional to the amplitude of the detection voltage V3. Then, the attraction force F whose magnitude corresponds to the amplitude of the pulse waveform q is generated.

The amplitude voltage, the pulse width, and the pulse output period of the pulse waveform p for detecting inductance variations may have such magnitude, size, or length as to allow detection of inductance variations with the detection voltage V3 and to prevent the magnetic field H capable of causing a displacement of the operation surface 30b that may be sensed by the operator from being generated. This makes it possible to prevent the operator from sensing a displacement of the operation surface 30b at every instant of detecting inductance variations. On the other hand, in order to ensure that the operator senses a displacement of the operation surface 30b caused by the pulse waveform q, the amplitude voltage, the pulse width, and the pulse output period of the pulse waveform q may have such magnitude, size, or length as to generate the magnetic field H capable of causing a displacement of the operation surface 30b that may be sensed by the operator. For example, at least one of the amplitude voltage and the pulse width of the pulse waveform q is greater than that of the pulse waveform p.

In the case where no such measure is taken, for example, a reset signal VR for preventing the reception circuit 67 from operating may be generated at least during generation of the pulse waveform q as illustrated in (d) of FIG. 16 in order to prevent the CPU 60 from erroneously detecting the detection voltage V3 generated by the output of the pulse waveform q for providing the operation surface 30b with a displacement as a signal representing inductance variations. As a result, it is possible to prevent the detection voltage V3 from being generated during the output period of the pulse waveform q as illustrated in (c) of FIG. 16. Further, since the pulse waveform q is output by the CPU 60, the CPU 60 may be configured to not evaluate the detection voltage V3 generated with the pulse waveform q as a signal representing inductance variations (that is, ignore the detection voltage V3 generated with the pulse waveform q).

Further, in FIG. 16, (b) indicates a control method that outputs the pulse waveform q having amplitude corresponding to the amount of pressing W, while such a control method is also possible that causes a displacement of the operation surface 30b by outputting the pulse waveform q having a pulse width corresponding to the amount of pressing W as illustrated in (f). The pulse width of the pulse waveform q increases as the amount of pressing W increases.

Further, as illustrated in (g) of FIG. 16, such a control method is also possible that causes a displacement of the operation surface 30b by outputting the pulse waveform q whose number of pulses corresponds to the amount of pressing W. The number of pulses of the pulse waveform q increases as the amount of pressing W increases.

Further, depending on applications using this operation input device 1 (for example, electronic apparatuses used by the operator, such as game machines and cellular phones), the pulse waveform q does not necessarily have to be in synchronization with the pulse waveform p. Accordingly, as illustrated in (h) of FIG. 16, a time interval for generating pulses of the pulse waveform q (the pulse output interval of the pulse waveform q) may be changed over multiple pulses of the pulse waveform p. The pulse waveform p for detecting inductance variations corresponds to the temporal resolution (slew rate) of detection of inductance variations. Therefore, it is desirable that pulses of the pulse waveform p be output at short time intervals. On the other hand, pulses of the pulse waveform q for causing a displacement of the operations surface 30b are output at longer intervals than those of the pulse waveform p in order to cause the operator to feel occurrence of a displacement of the operation surface 30b. For example, as illustrated in (h) of FIG. 16, pulses q1 through q9 of the pulse waveform q may be output in periods during which no pulses of the pulse waveform p are output so as not to overlap pulses of the pulse waveform p.

Further, in the case where the pulse output interval of the pulse waveform p is too short to secure the output timing of the pulse waveform q, the pulse waveform q may be given priority over the pulse waveform p, and the pulse output of the pulse waveform p may be stopped during the pulse output period of the pulse waveform q.

Further, in the case of FIG. 16, where a displacement is caused to the operation surface 30b in accordance with the amount of pressing W, it is possible to change the form of vibrations given to the operator because a change is caused in the manner in which electric current flows through the coils 21 through 24 by changing the form of feeding of the pulse waveform q. For example, it is possible to change the strength of vibrations given to the operator, a vibration frequency, and the number of vibrations by causing a change in the manner in which electric current flows through the coils 21 through 24 by changing the form of feeding of the second pulse signal. Further, the timing of generation of a displacement of the operation surface 30b may be changed not only in accordance with the amount of pressing W, but also in accordance with the pressing speed of the key 30 or a position to which an object caused to move by operating the key 30 (such as a cursor or pointer on a display) moves, or in response to occurrence of an event in an application in which the operation input device 1 is used. For example, the magnetic field H is generated to displace the operation surface 30b by feeding the second pulse signal to the coils 21 through 24 in response to the amount of pressing W of the key 30 reaching a predetermined value. It is possible to cause the operator to feel a click with the thus caused displacement of the operation surface 30b.

Figure 17:
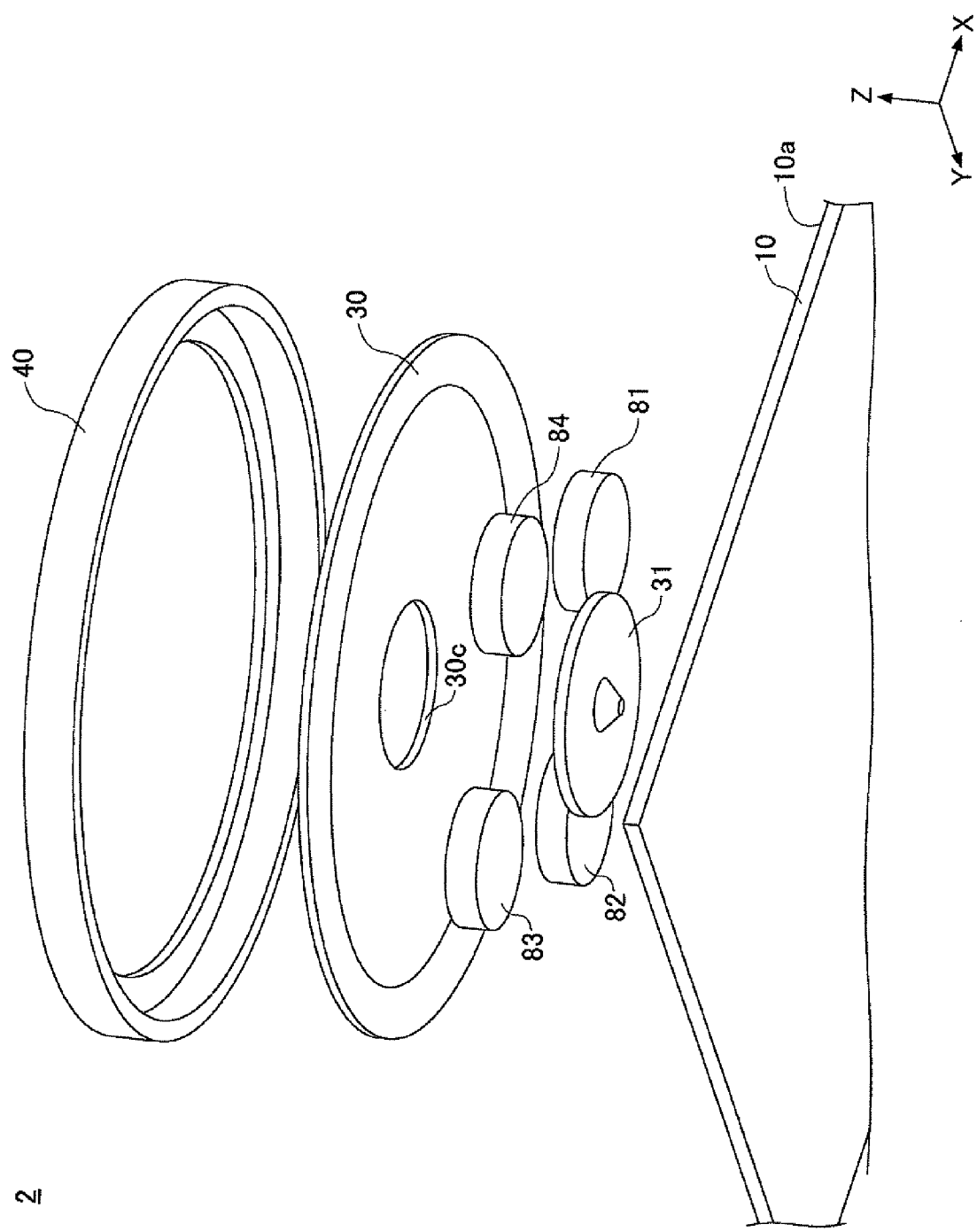
FIG. 17 is an exploded view of a second example of the operation input device according to the embodiment of the present invention.
Figure 18:
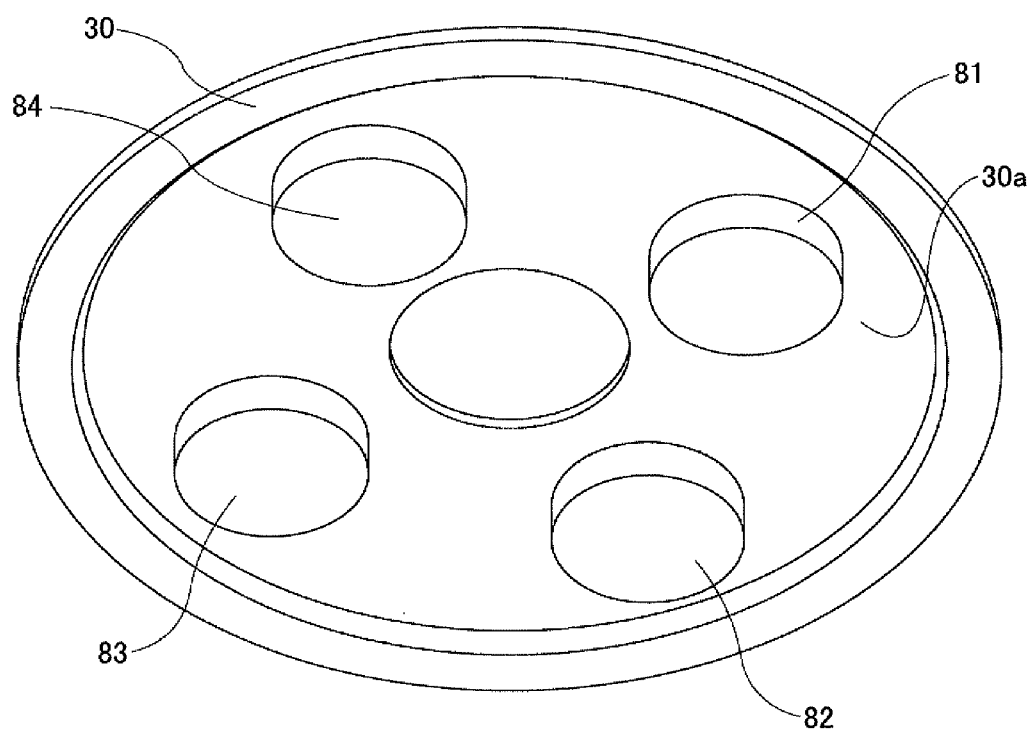
FIG. 18 is a diagram illustrating the key provided with cores according to the embodiment of the present invention.
Figure 19:
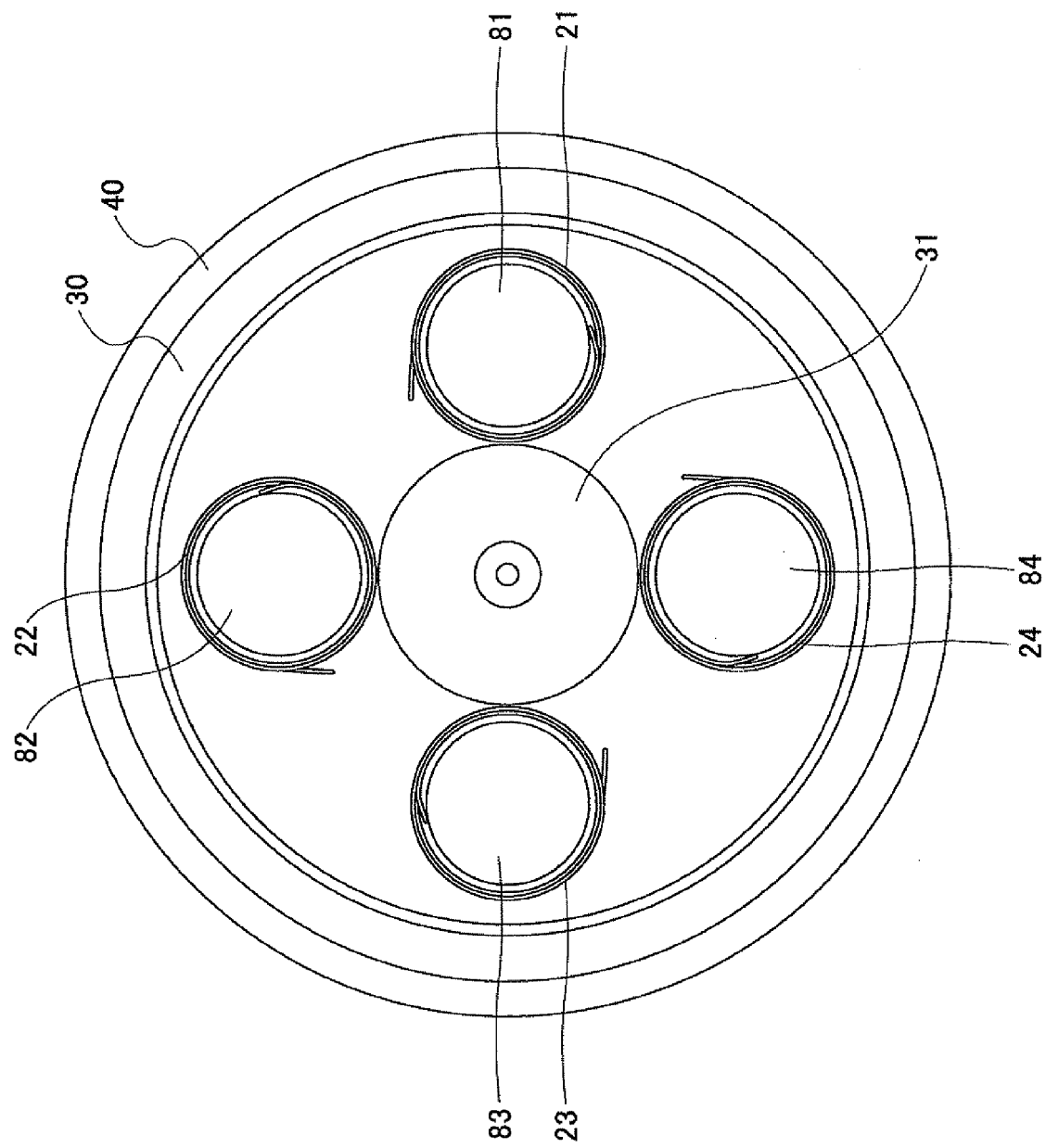
FIG. 19 is a diagram illustrating the positional relationship of components of the second example of the operation input device according to the embodiment of the present invention.
Figure 20:
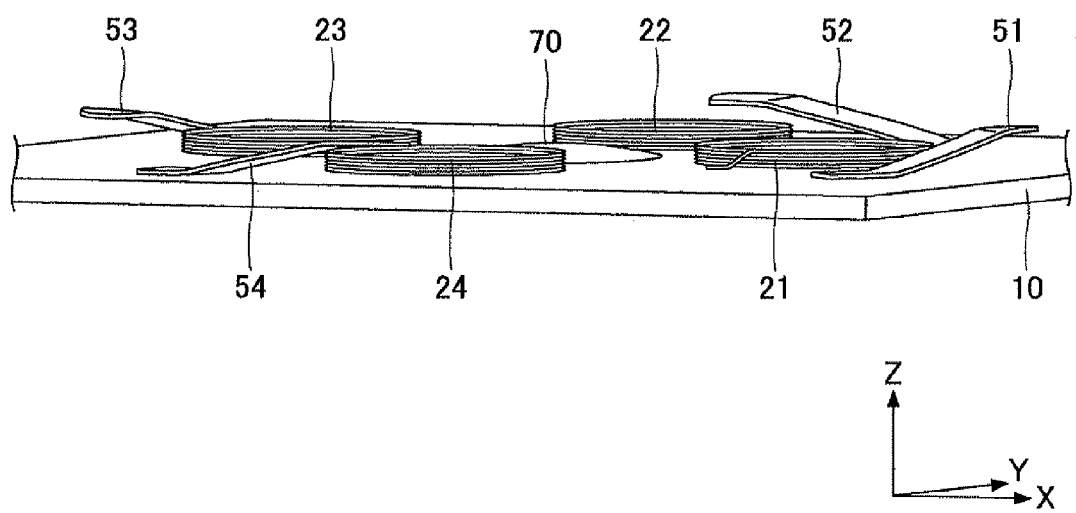
FIG. 20 is a diagram illustrating an arrangement of a click spring and the return springs according to the embodiment of the present invention.
Figure 21:
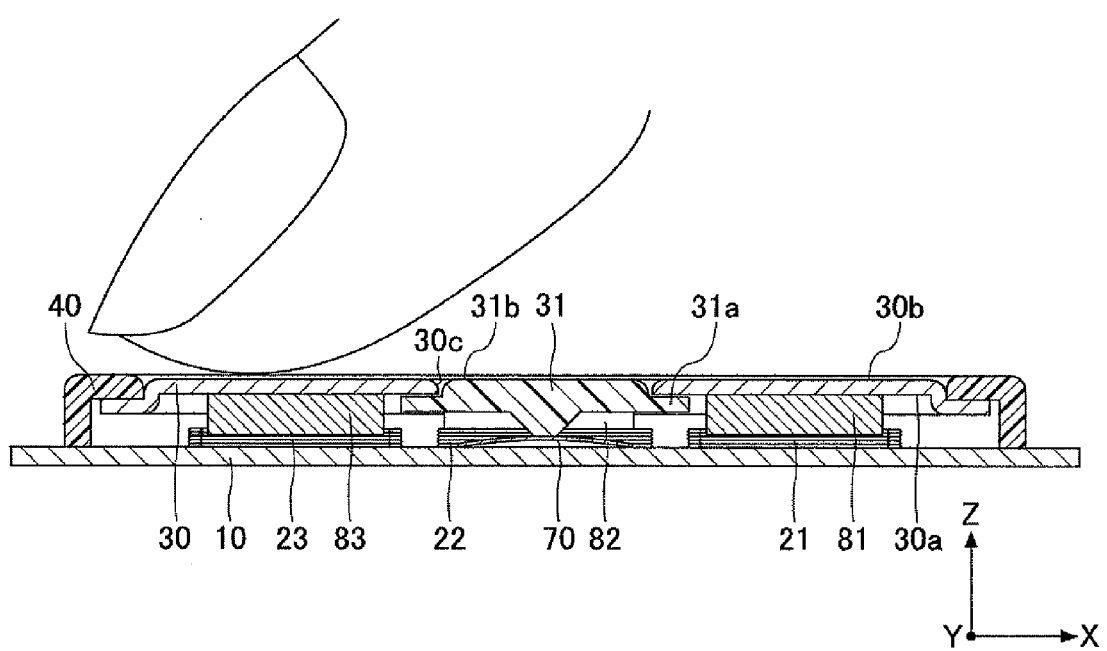
FIG. 21 is a cross-sectional view of the second example of the operation input device where an operator's finger is placed on the key according to the embodiment of the present invention.
Figure 22:
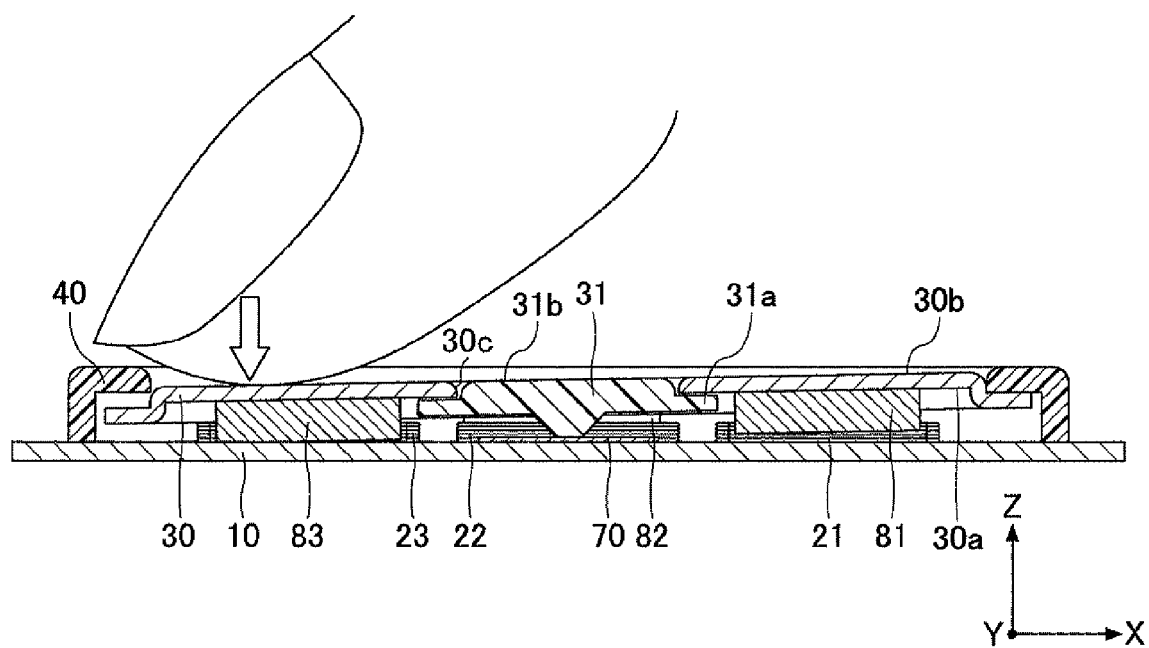
FIG. 22 is a cross-sectional view of the second example of the operation input device where the key is pressed at a position in an x(−) direction according to the embodiment of the present invention.

FIG. 17 is an exploded view of an operation input device 2, which is a second example of the operation input device of this embodiment. FIG. 18 is a diagram illustrating that as many cores as the number of coils placed on the placement surface 10a of the board 10 are provided on the opposed surface 30a of the key 30 facing the board 10. FIG. 19 is a diagram illustrating the positional relationship of the case 40, the key 30, cores 81 through 84, the coils 21 through 24, and a center key 31 viewed along the z-axis. FIG. 20 is a diagram illustrating an arrangement of a click spring 70 and the return springs 51 through 54. FIG. 21 is a cross-sectional view of the operation input device 2, illustrating a state where an operator's finger is placed on the key 30. FIG. 22 is a cross-sectional view of the operation input device 2, illustrating a state where the key 30 is pressed at a position in the x(−) direction. In these drawings, the same elements as those described above are referred to by the same reference numerals, and a description thereof is omitted.

The operation input device 2 includes the click spring 70 provided on the placement surface 10a of the board 10 at its center portion on the z-axis surrounded by the coils 21 through 24. The click spring 70 is a dome-shaped elastic member configured to provide a feeling of clicking to the operator pressing the operation surface 30b with a finger.

Further, the operation input device 2 includes the center key 31 on the z-axis. The center key 31 is sandwiched and held between the key 30 and the click spring 70. The center key 31 is supported in contact with the click spring 70. This makes it possible to reduce the thickness of the operation input device 2 in the z-axial directions compared with the case where the center key 31 is supported without contacting the click spring 70. The center key 31 is a press part having a surface 31b exposed at the operation surface 30b of the key 30 on the z-axis.

The center key 31 is configured to deform the click spring 70 from the z(+) side in response to application of the operator's force on at least one of the operation surface 30b of the key 30 and the exposed surface 31b. The click spring 70 is deformed by the pressing of both the key 30 and the center key 31 due to the application of the operator's force on the operation surface 30b. The click spring 70 is also deformed by the pressing of the center key 31 without the pressing of the key 30 due to the application of the operator's force on not the operation surface 30b but the exposed surface 31b. The center key 31 is positioned by being fit into a through hole 30c open at both the operation surface 30b and the opposed surface 30a of the key 30. The center key 31 may be circular, elliptical, or polygonal.

For example, the center key 31 includes a flange 31a formed at its edge. The flange 31a is a step part protruding like a brim at the edge of the center key 31. The center key 31 is held by being sandwiched between the opposed lower surface 30a of the key 30 and the top of the click spring 70 with the flange 31a being in contact with the key 30 in the periphery of the through hole (center hole) 30c. The portion of the center key 31 fit into the through hole 30c, which portion includes the exposed surface 31b, is held by the through hole (center hole) 30c serving as a guide. The operator may touch the exposed surface 31b. The operation surface 30b of the key 30 and the exposed surface 31b of the center key 31 in the standby state may be at the same position in the z-axial directions. Alternatively, the position of the operation surface 30b may be closer to the board 10 than the position of the exposed surface 31b is in the z-axial directions. In this case, the operator's force is applied on the exposed surface 31b of the center key 31 without being applied on the operation surface 30a of the key 30, so that the position of the exposed surface 31b moves in the direction in which the force is applied relative to the operation surface 30b with the operations surface 30b remaining at the same position in the z-axial directions.

As illustrated in FIG. 17 through FIG. 19, the four cores 81 through 84 are connected to the opposed surface 30a of the key 30 so as to move vertically in the same direction as the key 30 when the key 30 vertically moves. The cores 81 through 84 are inductance increasing members that increase the absolute value of the inductance of at least one of the coils 21 through 24. The cores 81 through 84 are placed at positions facing the coils 21 through 24, respectively. The outside diameter of the cores 81 through 84 is smaller than the inside diameter of the coils 21 through 24.

As illustrated in FIG. 20, the return springs 51, 52, 53, and 54 may be provided on the placement surface 10a of the board 10 so as to surround the coils 21 through 24.

FIG. 21 and FIG. 22 are diagrams for illustrating states of the operation input device 2 at the time of the operator operating the operation input device 2.

In FIG. 21 and FIG. 22, the center key 31 is in contact with the top of the click spring 70 and is held at the through hole (center hole) 30c of the key 30. The key 30 is held by the return springs 51 through 54 (FIG. 20) to be prevented from falling downward. Therefore, pressing the center key 31 with a finger causes the center key 31 to move downward independently to deform the click spring 70, thereby giving a feeling of clicking to the fingertip and closing contacts for detecting the pressing of the center key 31. That is, the click spring 70 operates as a switch.

In FIG. 22, pressing a portion of the key 30 around the through hole 30c, into which the center key 31 is fit, causes the key 30 to move downward deforming the return springs 51 through 54. At this point, since the center key 31 includes the flange 31a, the center key 31 also moves downward in conjunction with the downward movement of the key 30.

As illustrated in FIG. 21, in the standby (initial) state where the key 30 is not pressed, the cores 81 through 84 are positioned above the coils 21 through 24, respectively. Then, as illustrated in FIG. 22, when the key 30 is pressed, the cores 81 through 84 enter the coils 21 through 24, respectively, without contacting the coils 21 through 24 as the key 30 moves downward. The entry of the cores 81 through 84 into the corresponding coils 21 through 24 increases the magnetic permeability around the coils 21 through 24 to increase their inductance. In particular, the ambient magnetic permeability of the coil 23 among the four coils 21 through 24 increases to increase the inductance of the coil 23 since a force is applied on the operation surface 30b above the coil 23.

This change in inductance is detected with, for example, the inductance detecting circuit 100 illustrated in FIG. 13. On the other hand, the center key 31 that has moved downward in conjunction with the key 30 deforms the click spring 70, thereby giving a feeling of clicking to the fingertip and closing a switch caused to operate by the click spring 70. Then, like in the operation input device 1, the first pulse signal and the second pulse signal may be fed to each of the coils 21 through 24 by, for example, the control method illustrated with the waveform chart of FIG. 16 in the operation input device 2 as well.

Therefore, according to the second example, the magnetic permeability in the standby (initial) state of no application of force by the operator may be higher than in the case without a core, so that the absolute value of inductance may be higher. This effect makes it possible to reduce the height of coils and accordingly to reduce the thickness of the operation input device in the z-axial directions. Further, the gradient of an increase in inductance at the time of entry of a core into a coil is greater than in the case of being merely approached by a yoke, so that it is possible to increase sensitivity to the amount of pressing of the operation surface. Further, since it is possible to vary inductance with the movement of a core, it is possible to easily detect inductance variations without the key 30 having the function of a yoke. Accordingly, it is possible to form the key 30 with a nonmagnetic material. Further, since the core is not thin like a yoke and has a structure free of stress application, a fragile material such as ferrite may be used for the core.

Thus, according to the above-described examples, it is possible to generate a magnetic field to displace the operation surface by feeding a coil fed with a first pulse current for detecting an operator's operation input with a second pulse current different in phase from the first pulse current. Therefore, it is possible to implement the function of detecting an operator's force and the function of providing vibrations to the operator with an extremely simple configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present inventions has been described in detail, it should be understood that various changes, substitutions, and alterations could be made hereto without departing from the spirit and scope of the invention.

That is, other examples of the operation input device and the operation input detecting device of this embodiment may be implemented by combining the above-described examples.

Further, the operation input device may be configured to be operated by not only a finger but also a palm. The operation input device may also be configured to be operated by a toe or a sole. Further, the operation surface 30b of the key 30 may be flat, concave, or convex.

Further, in FIG. 7, a change may be caused elastically in the interval (distance) between the opposed surface 30a of the key 30 and the placement surface 10a of the board 10 by application of the operator's force, for example. Alternatively, a change may be caused elastically in the interval (distance) between the opposed surface 30a of the key 30 and the placement surface 10a of the board 10 by the deflection of the case 40 due to application of the operator's force.

What is claimed is:

1. An operation input device configured to receive a force, the operation input device comprising:
    a base part including a placement surface;
    a plurality of inductors placed on the placement surface;
    a displacement member including a first surface facing the placement surface and a second surface configured to receive an application of the force, the displacement member being configured to cause an inductance of each of the plurality of inductors to vary with an approach of the first surface to the placement surface due to the application of the force on the second surface;
    a support member configured to support the displacement member in such a manner as to allow a displacement of the displacement member;
    a detection part configured to detect a variation in the inductance by feeding a first pulse signal to the each of the plurality of inductors;
    a control part configured to generate a magnetic field to displace the second surface by feeding a second pulse signal to the each of the plurality of inductors, the second pulse signal being different in phase from the first pulse signal;
    an elastic member placed on the placement surface of the base part and surrounded by the plurality of inductors, said elastic member having a dome shape; and
    a center key provided to the first surface of the displacement member so as to contact and be supported by the elastic member,
    wherein a reset signal is generated so as to prevent the detection part from operating at least when the second pulse is generated.

2. The operation input device as claimed in claim 1, wherein the control part is configured to feed the second pulse signal in accordance with a result of detecting the variation in the inductance.

3. The operation input device as claimed in claim 1, wherein the control part is configured to vary at least one of an amplitude, a pulse width, a pulse interval, and a number of pulses of the second pulse signal in accordance with the result of detecting the variation in the inductance.

4. The operation input device as claimed in claim 1, wherein the second surface of the displacement member is vibrated by a variation of an attraction force from the inductor when the second pulse signal is provided to the inductor.

5. The operation input device as claimed in claim 1, wherein the second pulse has an interval longer than an interval of the first pulse.

6. The operation input device as claimed in claim 1, wherein the second pulse is not output when the first pulse is output, thereby preventing the second pulse from overlapping with the first pulse.

7. The operation input device as claimed in claim 1, wherein the first surface of the displacement member includes a through hole in which the center key fits.

8. The operation input device as claimed in claim 7, wherein the center key includes a step part at a flange portion thereof, said step part contacting the first surface of the displacement member so that the center key is held between the first surface of the displacement member and the elastic member.

9. A method of controlling an operation input device, comprising:
    detecting, by a detection part provided to the operation input device, a variation in an inductance of each of a plurality of inductors placed on a placement surface of a board by feeding a first pulse signal to the each of the plurality of inductors, the variation in the inductance being caused by an approach of a first surface of a displacement member to the placement surface due to an application of a force on a second surface of the displacement member; and
    generating a magnetic field to displace the second surface of the displacement member by feeding a second pulse signal to the each of the plurality of inductors, the second pulse signal being different in phase from the first pulse signal,
    wherein the method further comprises generating a reset signal so as to prevent the detection part from operating at least when the second pulse is generated, and
    wherein the operation input panel further includes:
    an elastic member placed on the placement surface of the base part and surrounded by the plurality of inductors, said elastic member having a dome shape; and
    a center key provided to the first surface of the displacement member so as to contact and be supported by the elastic member.

* * * * *